US007435174B2

(12) United States Patent
Baerlocher et al.

(10) Patent No.: US 7,435,174 B2
(45) **Date of Patent: *Oct. 14, 2008**

(54) GAMING DEVICE HAVING A PICK REDUCTION GAME INCLUDING A TRIGGER SELECTION INDICATOR

(75) Inventors: Anthony J. Baerlocher, Reno, NV (US); Joseph E. Kaminkow, Reno, NV (US); Megan N. Schlegel, Reno, NV (US); Randall D. Mead, Reno, NV (US)

(73) Assignee: IGT, Reno, NV (US)

(*) Notice: Subject to any disclaimer, the term of this patent is extended or adjusted under 35 U.S.C. 154(b) by 786 days.

This patent is subject to a terminal disclaimer.

(21) Appl. No.: 10/923,571

(22) Filed: Aug. 20, 2004

(65) Prior Publication Data

US 2005/0020351 A1 Jan. 27, 2005

Related U.S. Application Data

(63) Continuation of application No. 10/063,347, filed on Apr. 12, 2000, now Pat. No. 6,780,107, which is a continuation-in-part of application No. 10/071,138, filed on Feb. 8, 2002.

(51) Int. Cl.
*A63F 13/00* (2006.01)

(52) U.S. Cl. ....................... 463/16; 463/20; 273/143 R; 273/138.1; 273/139; 273/140

(58) Field of Classification Search .................... 463/16
See application file for complete search history.

(56) References Cited

U.S. PATENT DOCUMENTS

| | | | |
|---|---|---|---|
| 3,825,255 | A | 7/1974 | Kennard et al. |
| 4,695,053 | A | 9/1987 | Vazquez, Jr. et al. |
| 5,046,737 | A | 9/1991 | Fienberg |

(Continued)

FOREIGN PATENT DOCUMENTS

| | | |
|---|---|---|
| EP | 0874337 A1 | 10/1998 |

(Continued)

OTHER PUBLICATIONS

Fortune Hunter Brochure written by Aristocrat, published in 1995.

(Continued)

*Primary Examiner*—Robert Pezzuto
*Assistant Examiner*—Christopher H Bond
(74) *Attorney, Agent, or Firm*—Bell, Boyd & Lloyd LLP

(57) ABSTRACT

A gaming device and method having a pick reduction game. Initially, a plurality of first selections are displayed to the player. A number of picks is displayed to the player where the number of picks is greater than the number of first selections. The player uses the number of picks to pick first selections until the player picks a trigger selection. The number of picks are reduced after each pick by the player. When the player picks the trigger selection, the gaming device displays a plurality of second selections to the player. Each of the second selections is associated with an award. The player picks second selections and receives awards for each picked second selection until there are no picks remaining.

60 Claims, 13 Drawing Sheets

U.S. PATENT DOCUMENTS

| | | | |
|---|---|---|---|
| 5,092,598 | A | 3/1992 | Kamille |
| 5,342,047 | A | 8/1994 | Heidel et al. |
| 5,647,798 | A | 7/1997 | Falciglia |
| 5,755,619 | A | 5/1998 | Matsumoto et al. |
| 5,855,514 | A | 1/1999 | Kamille |
| 5,902,184 | A | 5/1999 | Bennett et al. |
| 5,919,088 | A | 7/1999 | Weiss |
| 5,931,467 | A | 8/1999 | Kamille |
| 5,997,401 | A | 12/1999 | Crawford |
| 6,015,346 | A | 1/2000 | Bennett |
| 6,059,289 | A | 5/2000 | Vancura |
| 6,089,976 | A | 7/2000 | Schneider et al. |
| 6,102,400 | A | 8/2000 | Scott et al. |
| 6,102,798 | A | 8/2000 | Bennett |
| 6,126,542 | A | 10/2000 | Fier |
| 6,142,873 | A | 11/2000 | Weiss et al. |
| 6,159,097 | A | 12/2000 | Gura |
| 6,159,098 | A | 12/2000 | Slomiany et al. |
| 6,164,652 | A | 12/2000 | Lauretta et al. |
| 6,174,235 | B1 | 1/2001 | Walker et al. |
| 6,176,487 | B1 | 1/2001 | Eklund et al. |
| 6,186,894 | B1 | 2/2001 | Mayeroff |
| 6,224,482 | B1 | 5/2001 | Bennett |
| 6,224,483 | B1 | 5/2001 | Mayernoff |
| 6,227,969 | B1 | 5/2001 | Yoseloff |
| 6,231,445 | B1 | 5/2001 | Acres |
| 6,261,177 | B1 | 7/2001 | Bennett |
| 6,270,412 | B1 | 8/2001 | Crawford et al. |
| 6,309,300 | B1 | 10/2001 | Glavich |
| 6,312,334 | B1 | 11/2001 | Yoseloff |
| 6,315,662 | B1 | 11/2001 | Jorasch et al. |
| 6,315,664 | B1 | 11/2001 | Baerlocher et al. |
| 6,319,124 | B1 | 11/2001 | Baerlocher et al. |
| 6,322,309 | B1 | 11/2001 | Thomas et al. |
| 6,346,043 | B1 | 2/2002 | Colin et al. |
| 6,347,996 | B1 | 2/2002 | Gilmore et al. |
| 6,398,644 | B1 | 6/2002 | Perrie et al. |
| 6,413,160 | B1 | 7/2002 | Vancura |
| 6,439,995 | B1 | 8/2002 | Hughs-Baird et al. |
| 6,443,837 | B1 | 9/2002 | Jaffe et al. |
| 6,491,583 | B1 | 12/2002 | Gauselmann |
| 6,506,117 | B2 | 1/2003 | DeMar et al. |
| 6,561,902 | B1 | 5/2003 | Walker et al. |
| 6,589,114 | B2 | 7/2003 | Rose |
| 6,592,457 | B1 | 7/2003 | Frohm et al. |
| 6,595,859 | B2 | 7/2003 | Lynn |
| 6,607,437 | B2 | 8/2003 | Casey et al. |
| 6,780,107 | B2 * | 8/2004 | Baerlocher et al. ............ 463/16 |
| 6,988,732 | B2 | 1/2006 | Vancura |
| 2002/0187827 | A1 | 12/2002 | Blankstein |
| 2003/0027616 | A1 | 2/2003 | Vancura |
| 2003/0036419 | A1 | 2/2003 | Baerlocher et al. |
| 2003/0060266 | A1 | 3/2003 | Baerlocher et al. |

FOREIGN PATENT DOCUMENTS

| | | | |
|---|---|---|---|
| EP | 0945837 | A2 | 9/1999 |
| EP | 0984409 | A2 | 3/2000 |
| EP | 1 266 677 | A1 | 12/2002 |
| EP | 1 298 607 | A2 | 2/2003 |
| GB | 2 144 644 | A | 3/1985 |
| WO | WO 00/12186 | | 3/2000 |

OTHER PUBLICATIONS

Wheel of Fortune Brochure written by IGT, published in 1998.

Spell Binder Article written by Strictly Slots, published in 2000.

Fortune Cookie Brochure written by IGT, published in 2000.

The Munsters Article and Website Page written by IGT, published in 2000, printed Mar. 21, 2001.

Who Done It Brochure written by WMS, published prior to 2002.

In Between Game Description written by IGT, publicly available prior to 2002.

Double Up Poker Game Description written by IGT, publicly available prior to 2002.

South Park Brochure written by IGT, published in 2000.

Ghoulish Gamble written by IGT, published date prior to 2002.

Believe It or Not Article published by Strictly Slots in Jun. 2001.

"The Price is Right" from www.curtalliaume.com dated Jul. 18, 2002.

The Encyclopedia of TV Game Shows. Third Ed. Checkmark Books, New York: 1999, pp. 176-180 written by David Scwartz et al.

Ten Chances from http://gscentral.net/10chan.stm, 1975.

"A Salute to Game Shows—The Price is Right-Pricing Games" from http:ben-schumin.simplenet.com/game-shows/shows/price-is-right/pricing-games-4.htm.

"Clock Game" from http://gscentral.net/clock.htm, 1972.

Deep Pockets Advertisement, written by IGT, published in 2002.

Deep Pockets Article, written by Strictly Slots, published in 2002.

Bullseye I (The Price is Right), printed from http://gscentral.net/pricing1.htm on Feb. 7, 2006, available prior to Feb. 8, 2002.

Slot Clock Game (The Price is Right), printed from http://gscentral.net/pricing1.htm on Feb. 7, 2006, available prior to Feb. 8, 2002.

Dice Game (The Price is Right), printed from http://gscentral.net/pricing1.htm on Feb. 7, 2006, available prior to Feb. 8, 2002.

Penny Ante (The Price is Right), printed from http://gscentral.net/pricing1.htm on Feb. 7, 2006, available prior to Feb. 8, 2002.

* cited by examiner

GAMING DEVICE HAVING A PICK REDUCTION GAME INCLUDING A TRIGGER SELECTION INDICATOR

PRIORITY CLAIM

This application is a continuation of, claims priority to and the benefit of U.S. patent application Ser. No. 10/063,347, filed on Apr. 12, 2002, now U.S. Pat. No. 6,780,107, the entire contents of which are incorporated herein, and which is a continuation-in-part of and claims the benefit of U.S. patent application Ser. No. 10/071,138, filed on Feb. 8, 2002.

CROSS REFERENCE TO RELATED APPLICATIONS

This application is related to the following commonly-owned patent applications: "GAMING DEVICE HAVING A BONUS SCHEME WITH MULTIPLE SELECTION GROUPS," Ser. No. 09/656,702, now U.S. Pat. No. 6,439,995; "GAMING DEVICE HAVING A MULTIPLE SELECTION GROUP BONUS ROUND," Ser. No. 09/605,107, now U.S. Pat. No. 6,511,375; "GAMING DEVICE HAVING AN AWARD EXCHANGE BONUS ROUND AND METHOD FOR REVEALING AWARD EXCHANGE POSSIBILITIES," Ser. No. 09/689,510, now abandoned; "GAMING DEVICE HAVING MULTIPLE CHOICE LARGE AWARD BONUS SCHEME," Ser. No. 09/686,284, now U.S. Pat. No. 6,875,108, "GAMING DEVICE HAVING A MULTIPLE SELECTION SET BONUS SCHEME," Ser. No. 09/680,592, now U.S. Pat. No. 6,602,135; "GAMING DEVICE HAVING RELATED MULTI-GAME BONUS SCHEME," Ser. No. 09/688,972, now U.S. Pat. No. 6,634,943; "GAMING DEVICE HAVING AN INDICATOR SELECTION WITH PROBABILITY-BASED OUTCOME BONUS SCHEME," Ser. No. 09/981,163, now U.S. Pat. No. 6,783,457; "GAMING DEVICE HAVING A BONUS SCHEME INCLUDING A PLURALITY OF SELECTION GROUPS WITH WIN-GROUP OUTCOMES," Ser. No. 09/981,084, now U.S. Pat. No. 6,932,701; "GAMING DEVICE HAVING A MULTIPLE SELECTION AND AWARD DISTRIBUTION BONUS SCHEME," Ser. No. 09/688,635, now U.S. Pat. No. 6,599,185; "GAMING DEVICE HAVING AN ELEMENT AND ELEMENT GROUP SELECTION AND ELIMINATION BONUS SCHEME," Ser. No. 09/689,381, now U.S. Pat. No. 6,585,591; "APPARATUS AND METHOD FOR MODIFYING GENERATED VALUES TO DETERMINE AN AWARD IN A GAMING DEVICE," Ser. No. 09/957,018, "GAMING DEVICE HAVING A BONUS SCHEME WITH MULTIPLE POTENTIAL AWARD SETS," Ser. No. 09/822,697, now U.S. Pat. No. 6,796,899; "GAMING DEVICE HAVING A PRIMARY GAME OUTCOME EMPLOYED IN A BONUS GAME," Ser. No. 09/943,976, now U.S. Pat. No. 6,793,578; "GAMING DEVICE HAVING PLAYER SELECTABLE AWARD DIGITS AND AWARD MODIFICATION OPTIONS," Ser. No. 09/934,003, "GAMING DEVICE HAVING A RELATED SYMBOL SELECTION GAME," Ser. No. 10/071,138, "GAMING DEVICE HAVING AWARD MODIFICATION OPTIONS FOR PLAYER SELECTABLE AWARD DIGITS," Ser. No. 09/933,843, now U.S. Pat. No. 7,172,506; "GAMING DEVICE HAVING AN INDICATOR SELECTION WITH PROBABILITY-BASED OUTCOME," Ser. No. 09/990,693, now U.S. Pat. No. 6,676,516; and "GAMING DEVICE WITH SIGNIFIED SYMBOLS," Ser. No. 09/990,484, now U.S. Pat. No. 6,558,254.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to a gaming device having a pick reduction game.

Gaming device manufacturers strive to make gaming devices that provide as much enjoyment and excitement as possible. Providing a secondary or bonus game in which a player has an opportunity to win potentially large awards or credits in addition to the awards associated with the primary or base game of the gaming device is one known method for enhancing player enjoyment and excitement.

Gaming devices having bonus games generally employ a triggering event that occurs during the operation of the base game of the gaming device. The triggering event temporarily stalls or halts the base game play and enables a player to enter a second, different game, which is the secondary or bonus game. The player plays the bonus game, likely receives an award, and returns to the base game.

Bonus games exist that include reels having target symbols or target symbol combinations where the player receives a bonus award for obtaining the particular target symbol or target symbol combination on the reels. The bonus award may be a predetermined award or a random award. In some bonus games, the bonus award is modified based on the number of attempts used by the player to obtain the target symbol or target symbol combination on the reels. The modified bonus award is provided to the player once the player obtains the target symbol or target symbol combination on the reels.

One such bonus game is described in U.S. Pat. No. 6,231,445, which is assigned to Acres Gaming, Inc. In this patent, several gaming machines having a plurality of reels are interconnected over a gaming network. Each of the gaming machines displays a plurality of reels having various symbols to the player in a primary or base game. If the player obtains a predetermined winning combination of symbols on the reels after a spin, a bonus game is triggered and a bonus award is provided to start the bonus game. In the bonus game, the bonus award immediately decreases after the first spin of the reels. Subsequently, the bonus award continues to decrease after each spin until the player obtains one of the winning symbols or winning symbol combinations on the reels. The player then receives the modified bonus award.

Gaming devices that increase the opportunities to obtain awards and increase the size of the awards are desirable. Players are attracted to games that provide several larger awards and the opportunity to obtain a very large award. Therefore, to increase player enjoyment and excitement, it is desirable to provide new games for gaming devices.

SUMMARY OF THE INVENTION

The present invention is directed to a gaming device having a pick reduction game and specifically, a bonus game. In one embodiment, primarily discussed herein, the gaming device displays a plurality of first selections, which are masked or hidden, to the player. Additionally, the gaming device displays a number of picks to the player. The number of picks is preferably greater than the number of first selections. However, in another embodiment, the number of picks may be equal to or less than the number of first selections.

The player uses the picks to pick selections from the plurality of first selections until the player picks a trigger selection. The number of picks are reduced by each pick by the player. Once the player obtains the trigger selection, the gaming device displays a plurality of second selections to the player. The first and second selections may be displayed separately on the same display device or on different display devices, or the second selections may replace the first selections on the same display device. The player uses the remaining number of picks to pick selections from the plurality of second selections. The plurality of second selections are associated with awards. Initially, the awards are masked or hidden from the player and an award is revealed after the player picks the second selection associated with that award. In one embodiment, if the player picks the trigger selection with the player's last pick or the player runs out of picks before picking the trigger selection, the player receives a consolation award. In another embodiment such as in a primary game, the player does not receive any awards and the game ends.

In a further embodiment, the gaming device provides the player with additional picks to choose second selections in the game. If the player has picks remaining after picking the trigger selection, the player also receives the additional picks to choose second selections to receive extra awards. If the player does not have any picks remaining, the player just receives the additional picks and thereby has the minimum number of picks to pick second selections in the bonus game. In this embodiment, the player receives at least a minimum number of picks to pick second selections and obtain awards in the bonus game.

The player's goal is to obtain the trigger selection from the plurality of first selections as quickly as possible so that the player has the maximum number of picks to use to pick selections from the plurality of second selections. The player uses the picks to choose second selections from the plurality of second selections and accumulates the awards associated with each of the second selections picked by the player. The total accumulated award obtained by the player when the player has no picks remaining is the award provided to the player at the end of the bonus game. In one embodiment, the awards include at least one relatively large award. In this manner, the player still has an opportunity to obtain the relatively large award, even if the player has only one pick to use to choose selections from the plurality of second selections.

In another embodiment of the present invention, a bonus symbol is associated with one or more of the plurality of first selections and/or one or more of the plurality of second selections. The bonus symbol provides the player with a predetermined or random number of additional picks in the bonus game. The player may use the additional picks to obtain the trigger selection from the plurality of first selections and thereby receive more picks to choose selections from the plurality of second selections. Additionally, if the player picks the bonus symbol from the plurality of second selections, the player obtains additional picks and thereby receives more awards and possibly, a relatively large award. In a further embodiment, at least one additional pick is associated with one of the first or second selections.

In a further embodiment, relationship indicators are displayed to the player and associated with the plurality of first selections. In one embodiment, the relationship indicators automatically indicate the location or relationship of the trigger selection with respect to the player's last selection or pick from the plurality of first selections. In another embodiment, the player may choose to receive a "hint" by pressing a button or selector and use the relationship indicators to indicate the relative location of the trigger selection in the plurality of first selections. If the player chooses to use the "hint" and thereby the relationship indicators, the player in one embodiment will lose one or more picks to obtain this advantage. Otherwise, the player does not have to use the relationship indicators and may proceed as described above.

In still a further embodiment, the number of picks, the plurality of first selections, and the plurality of second selections displayed to the player by the gaming device are displayed in various shapes, characters or symbols. Preferably, the number of picks, the plurality of first selections and the plurality of second selections are designated with symbols or characters that are associated with the theme of the game.

In an alternative embodiment, the first selections are displayed on a mechanical display. The selections on the mechanical display are covered by movable revealing members such as mechanical doors that move such as by raising and lowering over the selections to reveal or hide the selections, respectively. In one aspect of this embodiment, the selections are displayed on a video display device and the mechanical doors slide over the display device. In another aspect of this embodiment, the mechanical doors slide over mechanical reels, which spin to indicate one or more trigger selections.

In another alternative embodiment, a plurality of sets of first selections are displayed to a player. Each set includes at least one trigger selection. Additionally, a picks remaining display is associated with each of the sets of first selections where a number of picks is indicated in each picks remaining display. The player uses the picks to pick first selections in each of the sets. The player continues to pick first selections in each of the sets until the player picks the trigger selection in one or more of the sets or until there are no picks remaining in the sets. The number of picks indicated in each picks remaining display after the player is finished picking selections, is summed or totaled to provide the player with a total number of picks remaining for the set of seconds selections. The player uses the total number of picks to choose second selections to obtain awards. Alternatively, the player must pick the trigger in each set of first selections to get to the set of second selections. In further alternative embodiments, the player must pick the trigger selection in at least two of the sets of first selections, in one or more specific sets, or in any desired combination of sets.

Although the present invention is primarily discussed relative to the bonus game of a gaming device, it should be appreciated that the present invention could be employed as a primary game in a gaming device.

It is therefore an advantage of the present invention to provide a gaming device having a pick reduction game that provides an opportunity for a player to obtain a large award.

Another advantage of the present invention is to provide larger awards to players that increase player excitement and entertainment.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
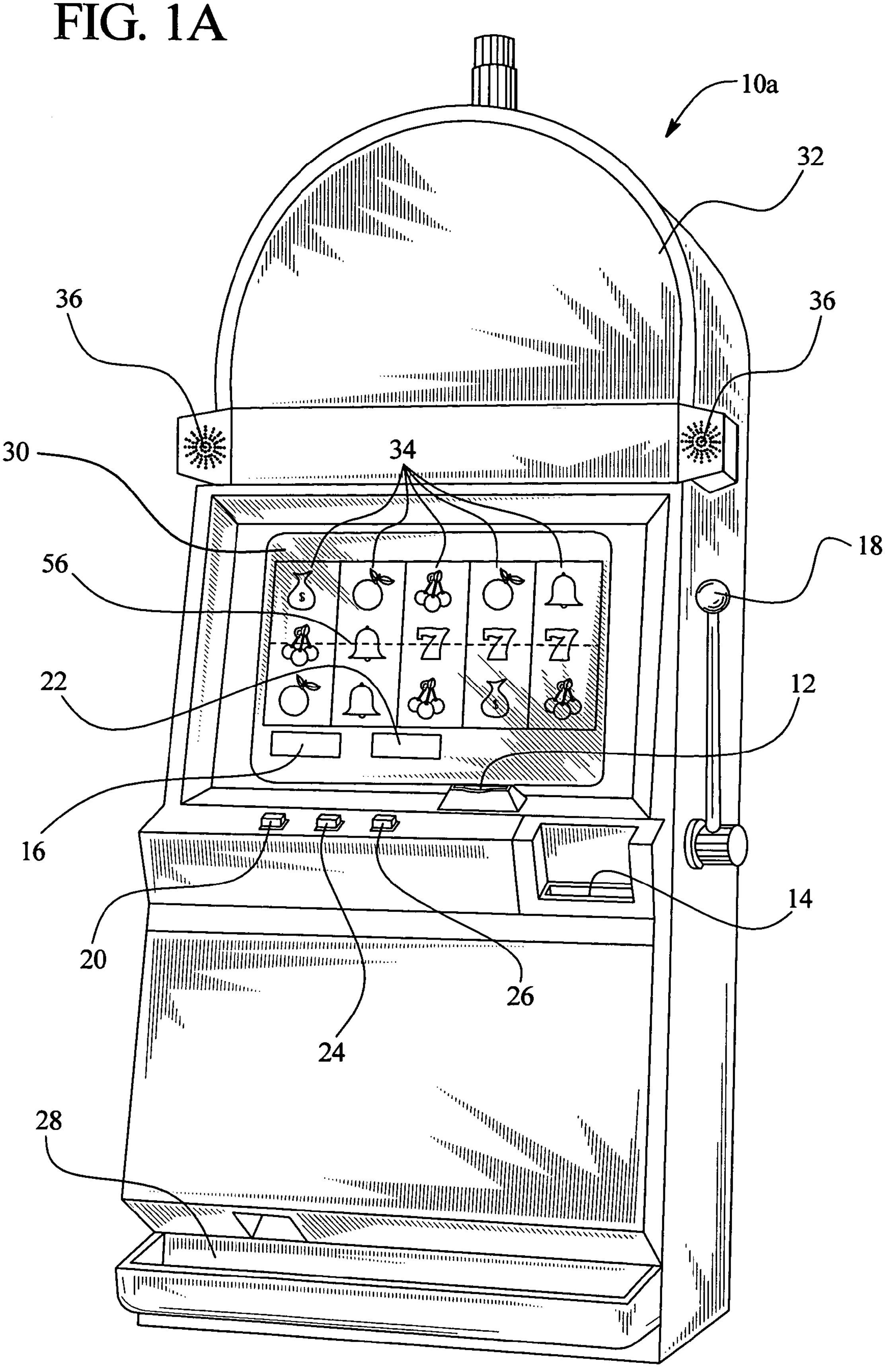
FIG. 1A is a front perspective view of one embodiment of the gaming device of the present invention.
Figure 1B:
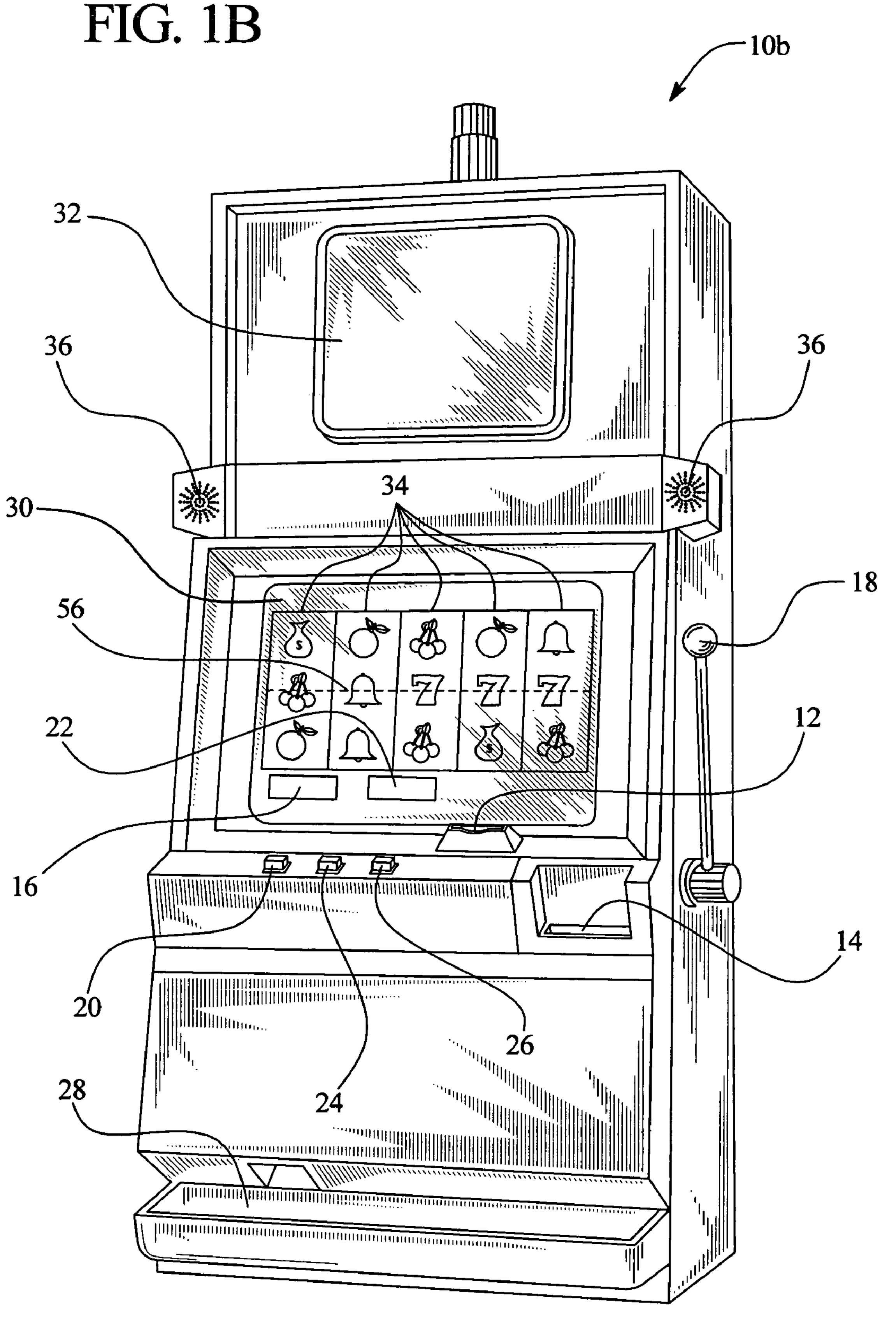
FIG. 1B is a front perspective of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 in one embodiment has the controls, displays and features of a conventional slot machine. It is constructed so that a player can operate it while standing or sitting, and gaming device 10 is preferably mounted in a cabinet. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker, blackjack or keno, and any of the bonus triggering events and bonus games associated with these primary games. The symbols and indicia used on and in gaming device 10 may be in mechanical, electrical, electronic or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. Other bet or wager indicators such as a bet max button may also be employed in the gaming device of present invention.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 in one embodiment displays a plurality of reels 34 such as three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor. Each reel 34 displays a plurality of indicia such as bells, hearts, fruits, numbers, letters, bars or other images which preferably correspond to a theme associated with the gaming device 10. Furthermore, gaming device 10 preferably includes speakers 36 for producing sounds such as music.

Figure 2:
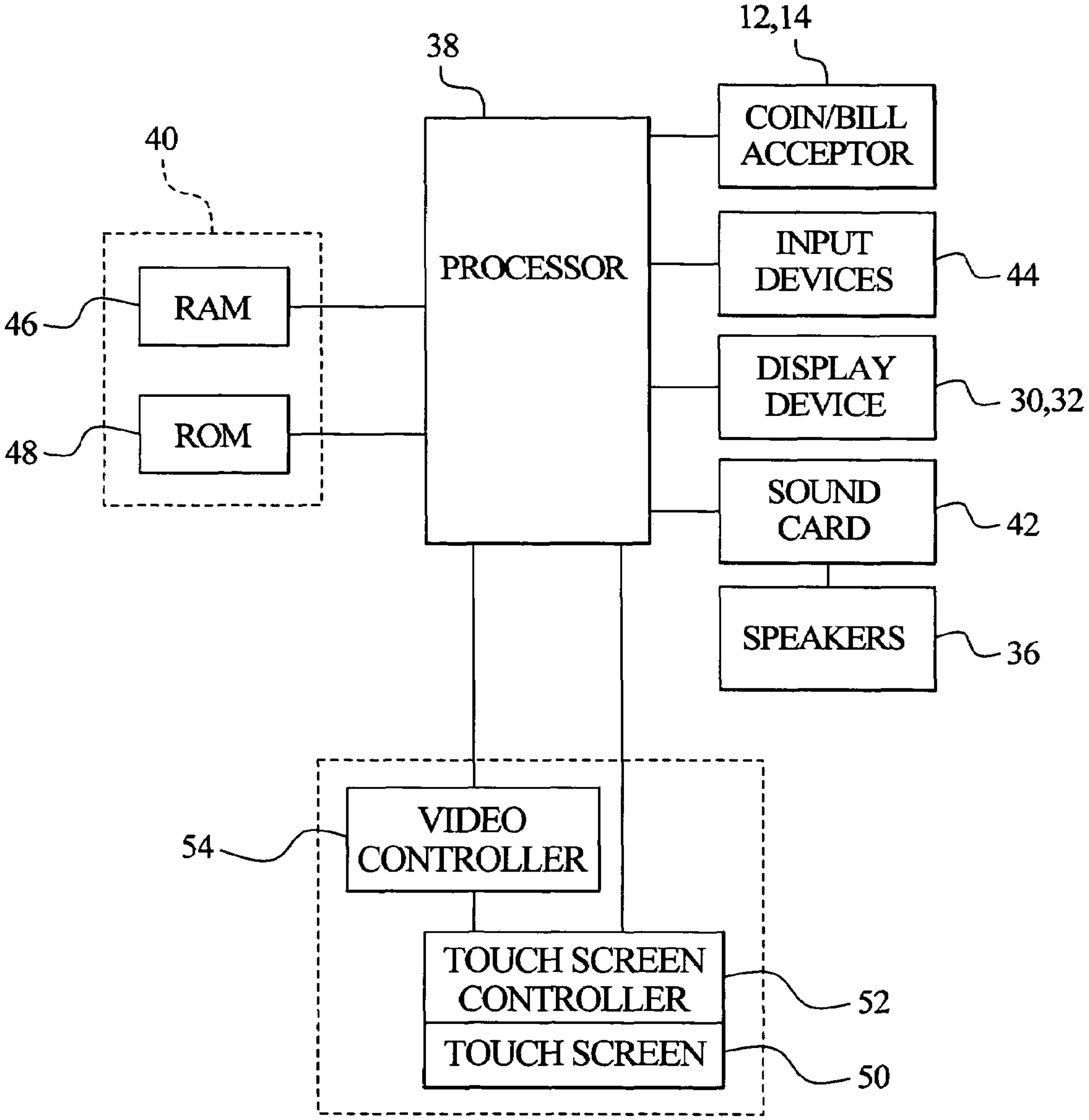
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. One or more secondary processors may also be employed in conjunction with the primary processor to control certain aspects of the game function. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 are generally referred to herein as the "computer" or "controller."

With reference to FIGS. 1A, 1B and 2, to operate the gaming device 10, in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, in one embodiment gaming device 10 also gives players the opportunity to win credits in a bonus round. This type of gaming device 10 will include a program which will automatically begins a bonus round when the player has achieved a qualifying condition in the game. This qualifying condition can be a particular arrangement of indicia on a display device. The gaming device 10 may use mechanical devices or a video-based central display device 30 to enable the player to play the bonus round. In one embodiment, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Bonus Game

Figure 3A:
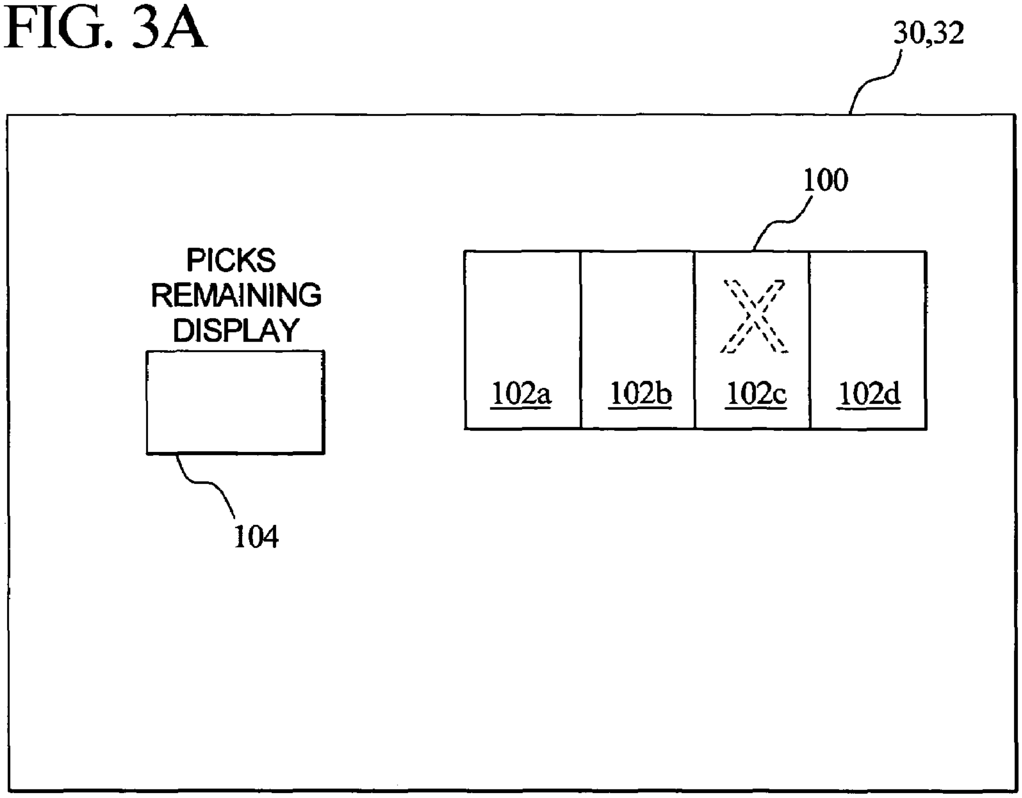
FIGS. 3A and 3B are enlarged front elevation views of one of the display devices of FIGS. 1A and 1B illustrating one embodiment of the present invention.
Figure 3B:
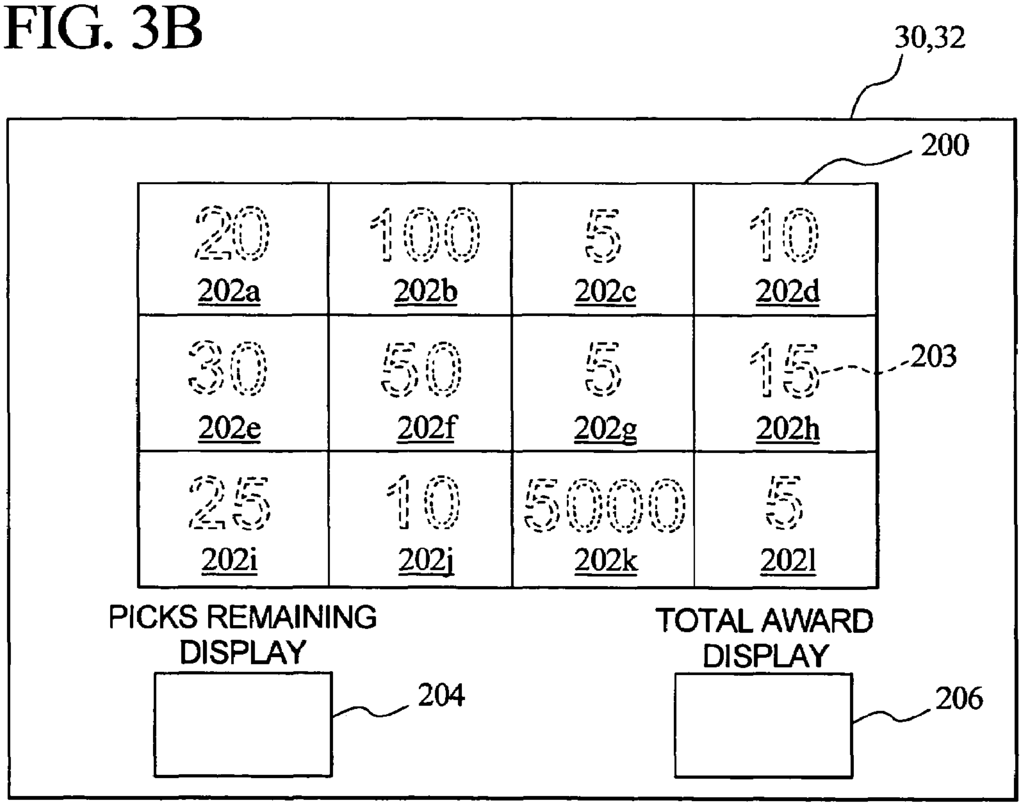

In one embodiment of the present invention, if a player achieves a bonus triggering or qualifying condition during the primary game, the gaming device 10 initiates the secondary or bonus game of the present invention. Referring now to FIGS. 3A and 3B, the bonus game includes a plurality of first selections 100 and a plurality of second selections 200. A plurality of first selections or first selection set 100 includes at least two masked first selections 102. In FIG. 3A, there are four masked first selections 102*a*, 102*b*, 102*c* and 102*d*. At least one trigger selection 102*c* is associated with one of the masked selections 102. The trigger selection may be designated with any symbol or character preferred by the game implementor to indicate that a particular selection is the trigger selection. A number of picks is associated with the plurality of first selections 100, as indicated by the picks remaining display 104. Once the bonus game is initiated, the gaming device displays the plurality of first selections 100 and a number of picks in the picks remaining display 104.

In one embodiment, the number of selections 102 in the plurality of first selections 100 is at least one less than the number of picks initially provided to the player in picks remaining display 104. Accordingly, the player will always have at least one remaining pick after obtaining the trigger selection to choose at least one of the second selections. Therefore, the player will always have an opportunity or chance to obtain the relatively large award associated with the second selection even though the probability of obtaining that award is lower than if the player has a larger number of picks.

In another embodiment, the number of selections 102 in the plurality of first selections 100 is equal to or greater than the number of picks initially provided to the player in picks remaining display 104. In this embodiment, the player may obtain the trigger selection with the player's last pick or run out of picks before picking the trigger selection. In either case, the player does not have any picks remaining in the game and therefore, the player cannot pick from the plurality of second selections. In one embodiment, if the player picks the trigger selection with the player's final pick or the player runs out of picks prior to picking the trigger selection in the bonus game, the player receives a consolation award and the bonus game ends. The consolation award may be any award including, but not limited to, free spins, free games, multipliers and credits. In another embodiment, the game ends and the player does not receive any awards in the game. This game may be best suited for a primary game where the player does not necessarily obtain an award in each game as is typical in bonus games. In such primary games a wager would be placed on the set of first selections. The amount of the wager could also determine the number of picks in the first selections and/or additional picks in the second selections. Additionally, the amount of the wager could determine the number of sets of first selections provided to the player in the game. Varying the number of trigger selections and/or the number of first selection sets varies the probability that the player will initiate the bonus game and thereby increases the players excitement and enjoyment of the game. It should also be appreciated that the number of first selections and the number of picks may vary in a game.

In a further embodiment, the gaming device provides the player with an additional number of picks to pick second selections in the bonus game. If the player picks the trigger selection before running out of picks in the primary game, the player will also receive additional picks to choose second selections to obtain extra awards in the bonus game. If the player runs out of picks before picking the trigger selection in the primary game, the player receives only the additional picks and thus, still has a minimum number of picks to choose second selections.

In a bonus game, the player uses the picks provided to the player by the gaming device to pick selections from the plurality of first selections 100. The player continues to pick one of the selections 102 from the plurality of first selections 100 until the player picks the trigger selection 102*c*. Once the player picks the trigger selection 102*c*, the gaming device displays a plurality of second selections 200 to the player. In one embodiment, the second selections are displayed separately from the first selections on the same display device or on different display devices. In another embodiment, the second selections replace the first selections on the same display device.

The player receives the number of picks displayed in the picks remaining display 104 after the player picks the trigger selection 102*c*. In this example, the player receives the maximum number of picks possible, which is one less than the number of picks provided to the player at the beginning of the game, if the player selects the trigger selection with the player's first pick. In any event, the player receives at least one pick if the player selects or picks the trigger selection 102*c* with the final pick.

In FIG. 3B, the gaming device displays a plurality of second selections 200 that include several selections 202*a* to 202*l*. Each selection 202 is associated with an award 203. Initially, all of the awards 203 are masked or hidden from the player. Once the player picks a particular selection 202 from the plurality of second selections 200, the award 203 that is associated with the picked selection is revealed or shown to the player. In one embodiment, the awards 203 include a plurality of relatively small awards and one relatively large award. In FIG. 3B, the relatively large award is illustrated in selection 202*k*, which includes an award of five thousand. It should be appreciated that the awards 203 associated with the selections 202 may include a plurality of relatively small awards, a plurality of relatively large awards, or any combination therein. Additionally, the number of selections 202 in the plurality of second selections 200 may include any number of selections as desired by the game implementor. In one embodiment, the number of selections 202 and the plurality of second selections 200 is equal to or greater than the number of first selections 102 in the plurality of first selections 100. It should be appreciated that the number of first selections 100 and the number of second selections 200 may include the same number or a different number of selections.

A picks remaining display 204 initially indicates the number of picks transferred from the picks remaining display 104 that the player received by picking the trigger selection 102*c*. In one embodiment, the number of picks indicated by the picks remaining display 204 reduces by one each time the player picks a selection 202 from the plurality of second selections 200. In other embodiments, the number of picks indicated by the picks remaining display 204 decreases or increases by a predetermined or random number of picks. The total award display 206 indicates the accumulated award received by the player based on the awards that are revealed after each pick of a selection 202 from the plurality of second selections 200 by the player. The total award indicated by the total award display 206 when the player runs out of picks is the total award provided to the player for that game.

Figure 4A:
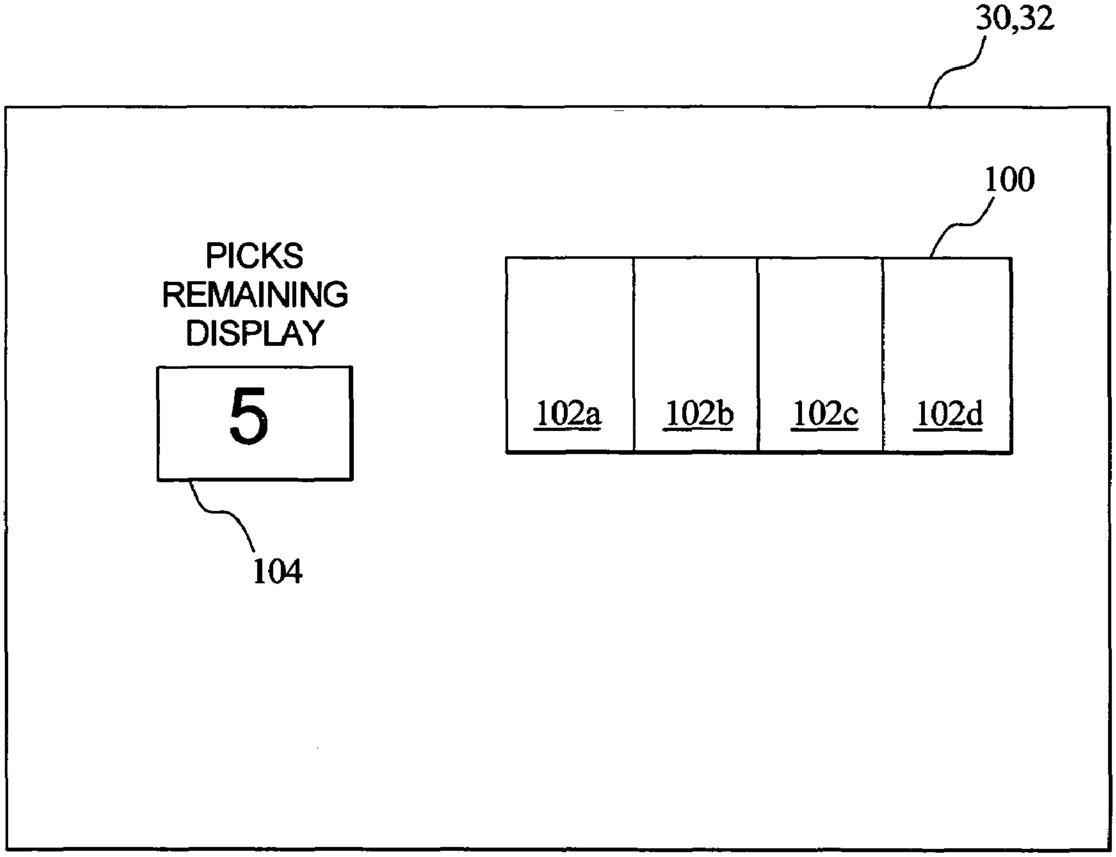
FIGS. 4A, 4B, 4C, 4D and 4E are enlarged front elevation views of one of the display devices of FIGS. 1A and 1B illustrating the first four picks by a player from a plurality of first selections where the player chooses the trigger selection with the player's final pick in the game.

Referring now to FIGS. 4A, 4B, 4C, 4D and 4E, an example of one embodiment of the present invention is illustrated where the gaming device displays four selections 102*a*, 102*b*, 102*c* and 102*d* in a plurality of first selections 100 to the player. As shown in FIG. 4A, the gaming device provides the player with five picks, as indicated by the picks remaining display 104, to begin the game. Thus, the player may receive a maximum of four picks if the player obtains or picks the trigger selection with the player's first pick in the game. The minimum number of picks that the player can receive is one pick where the player picks the trigger selection with the final pick in the game.

Figure 4B:
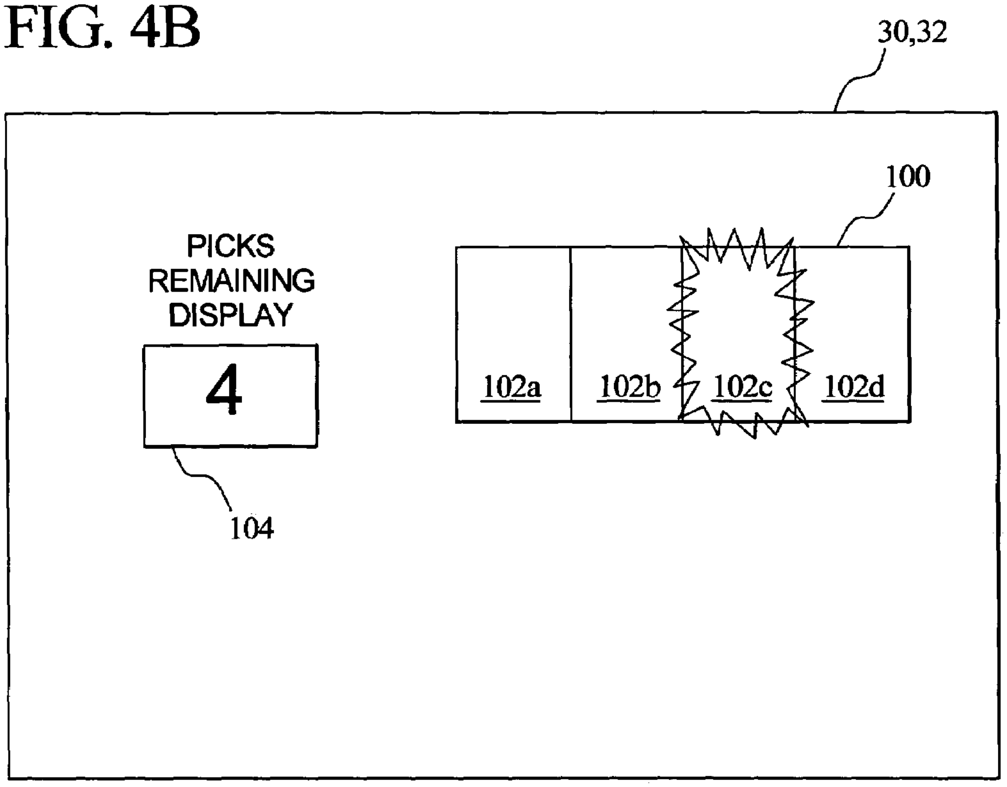

In FIG. 4B, the player picks selection 102*c* with the first pick in the bonus game. The selection 102*c* is not the trigger selection, however, and therefore the player must make another pick from the plurality of first selections 100. The number of picks is reduced by one, from five to four.

Figure 4C:
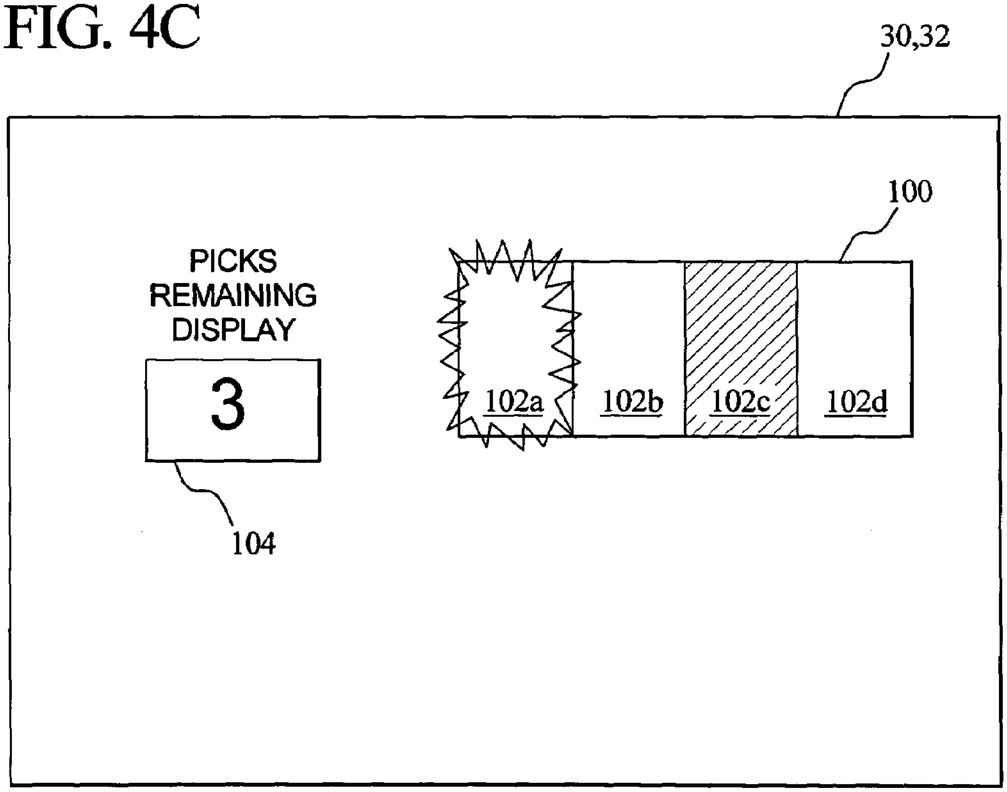
Figure 4D:
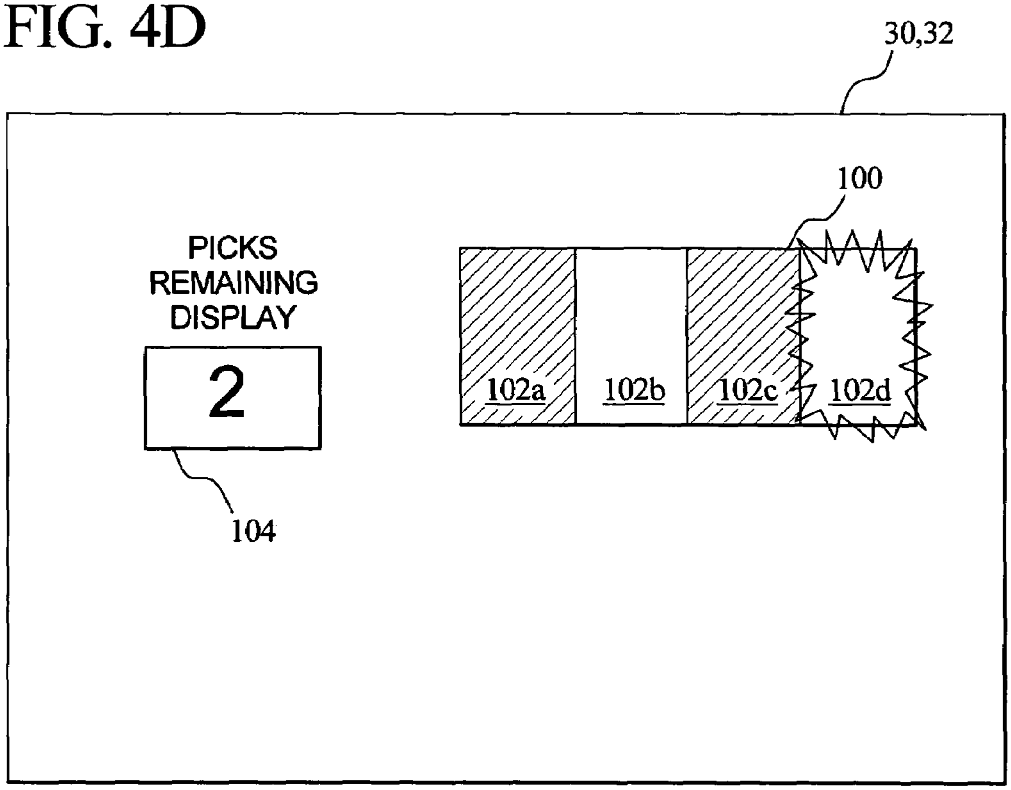

Referring to FIG. 4C, the player now has four picks left in the game as indicated by the picks remaining display 104. Therefore, if the player picks the trigger selection with this pick, the player will receive three picks to use when choosing selections 202 from the plurality of second selections 200. The player picks selection 102*a* with the second pick. Unfortunately, the selection 102*a* is not the trigger selection. The number of picks is reduced by one, from four to three, and the player must make another pick from the plurality of first selections 100.

In FIG. 4D, the player picks again from the plurality of first selections 100 in the bonus game. With the third pick, the player picks selection 102*d* from the plurality of first selections 100. The selection 102*d* is still not the trigger selection. Therefore, the number of picks is reduced by one again, from three to two, and now there is only one selection 102*b* remaining in the plurality of first selections 100.

In one embodiment, the trigger selection 102*b*, which is the only remaining selection available to the player, is revealed to the player automatically. Thus, the player receives the minimum number of picks which, in this example, is one, to pick selections 202 from the plurality of second selections 200. Even though the player received the minimum number of picks, one, the player still has an opportunity to pick or receive a relatively large award in the bonus game. Therefore, the probability that the player will pick the relatively large award with only one pick is less than if the player had more picks remaining. However, the player still has a slight probability or chance to pick the relatively large award, which creates player excitement.

Figure 4E:
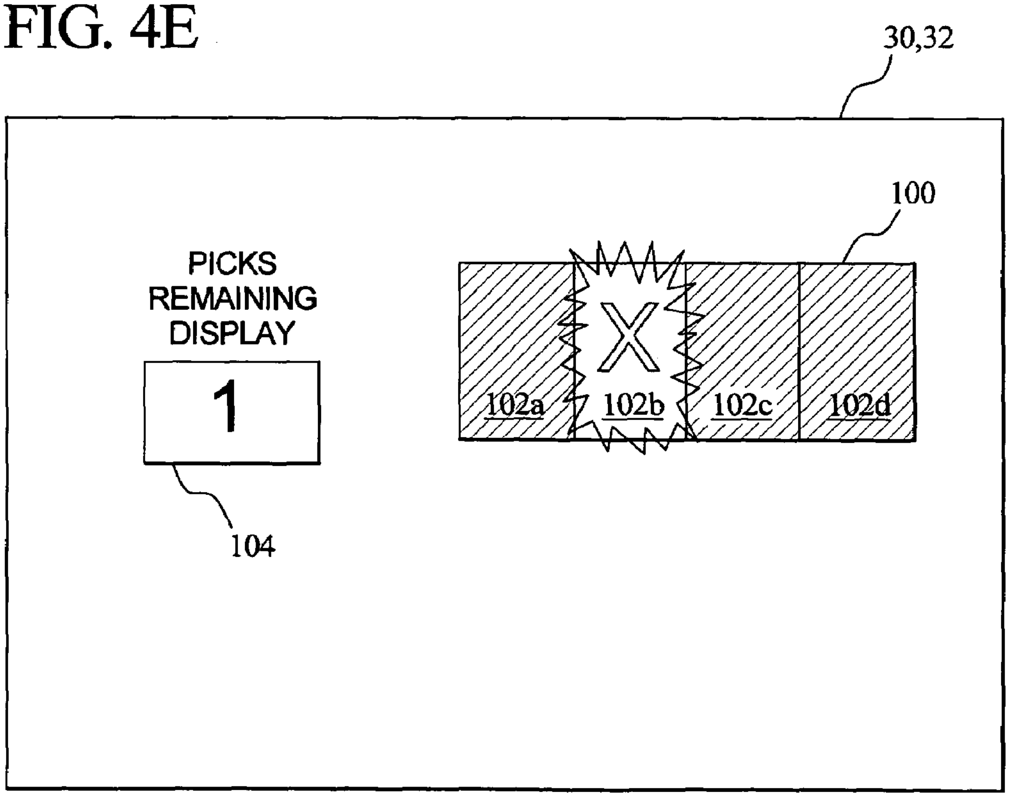

Referring to FIG. 4E, the player automatically receives the trigger selection 102*b* as described above. Thus, the player has one pick to use to pick a selection 202 from the plurality of second selections 200. Once the player obtains the trigger selection 102*b*, the gaming device displays the plurality of second selections 200 to the player and also transfers the number of picks indicated by the picks remaining display 104 to the picks remaining display 204, which is associated with the plurality of second selections 200.

Figure 4F:
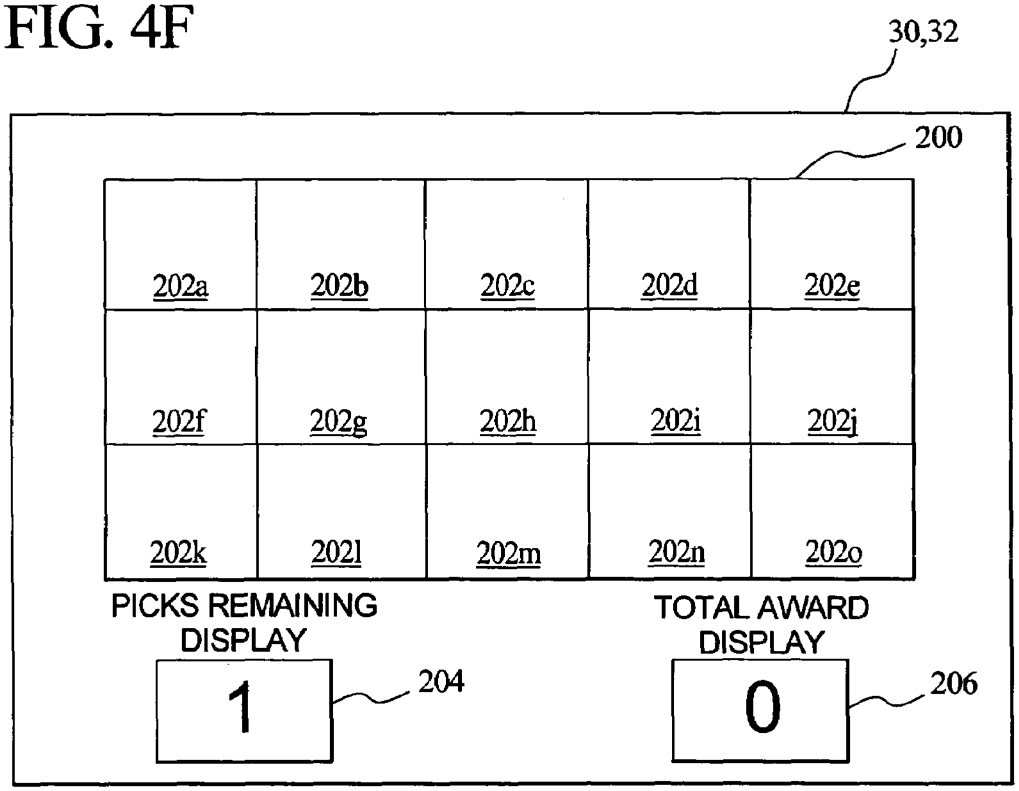
FIGS. 4F and 4G are enlarged front elevation views of the display devices of FIGS. 1A and 1B illustrating the first and only pick by a player from a plurality of second selections where the player picks the relatively large award.
Figure 4G:
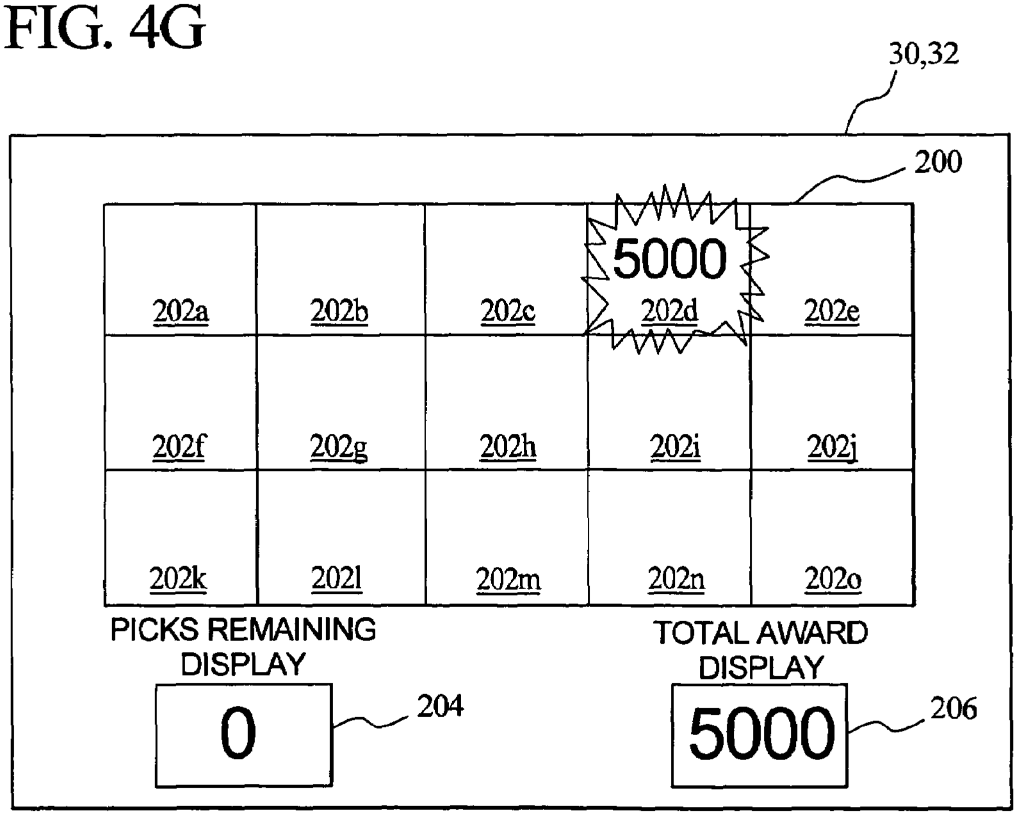

Referring now to FIGS. 4F and 4G, the gaming device displays a plurality of second selections 200. A plurality of awards 203 (not shown) are associated with the second selections 200. The awards are initially masked to the player and are revealed when the player picks a particular selection 202 from the plurality of selections 200. In FIG. 4F, the player uses the player's only pick to pick selection 202*d* from the plurality of second selections 200. Fortunately, the player picks the selection associated with the relatively large award of five thousand. The player does not have any picks remaining and therefore the bonus game ends. However, the player did pick and obtain the largest single award of five thousand in the bonus game. This award is transferred to the total award display 206 and is provided to the player because the bonus game has ended.

This example illustrates how the present invention maintains the level of excitement and enjoyment of the bonus game by enabling players to always have a chance or opportunity of obtaining the relatively large award or the single largest award in the game. After the bonus game begins, the player's odds or chances for obtaining the relatively large award decrease after each pick by the player from the plurality of first selections 100 until the player obtains the trigger selection. However, the player still has a slight probability or chance of obtaining the relatively large award even though the player may have only one pick to choose one of the second selections 200. Thus, the odds of obtaining the relatively large award in the bonus game decrease, but never reach zero, and thereby players always have a chance to obtain the relatively large award.

Figure 5A:
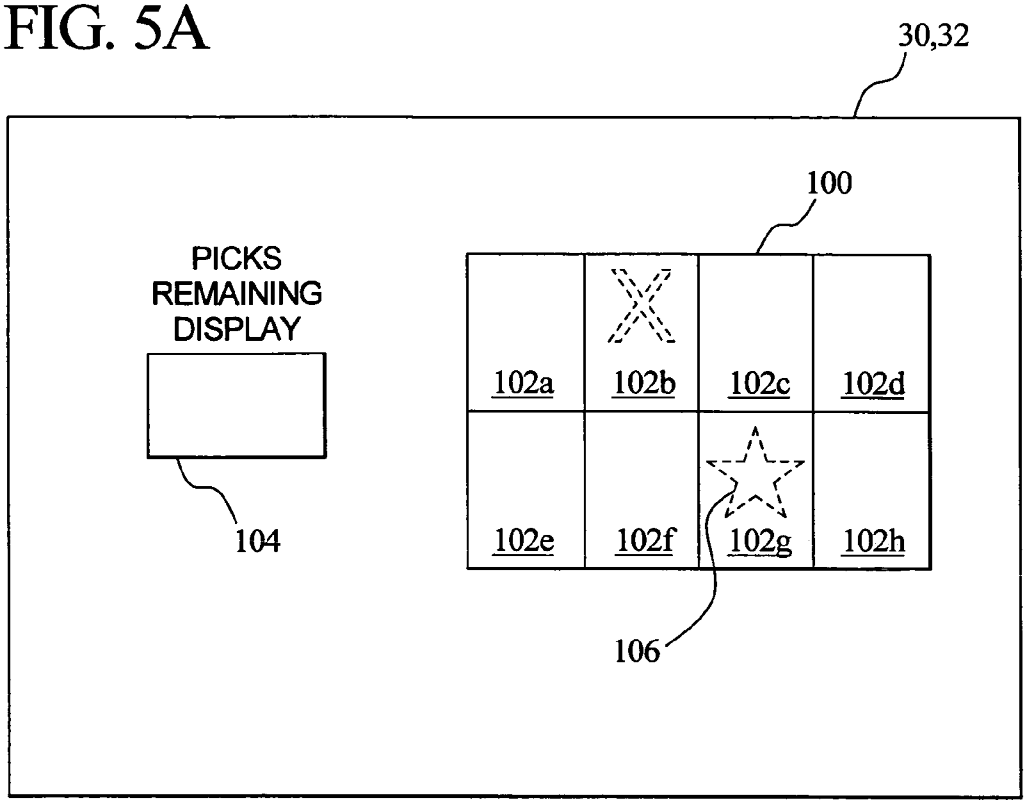
FIGS. 5A and 5B are enlarged front elevation views of the display devices of FIGS. 1A and 1B illustrating another embodiment of the present invention where the plurality of first selections and the plurality of second selections include a bonus symbol.
Figure 5B:
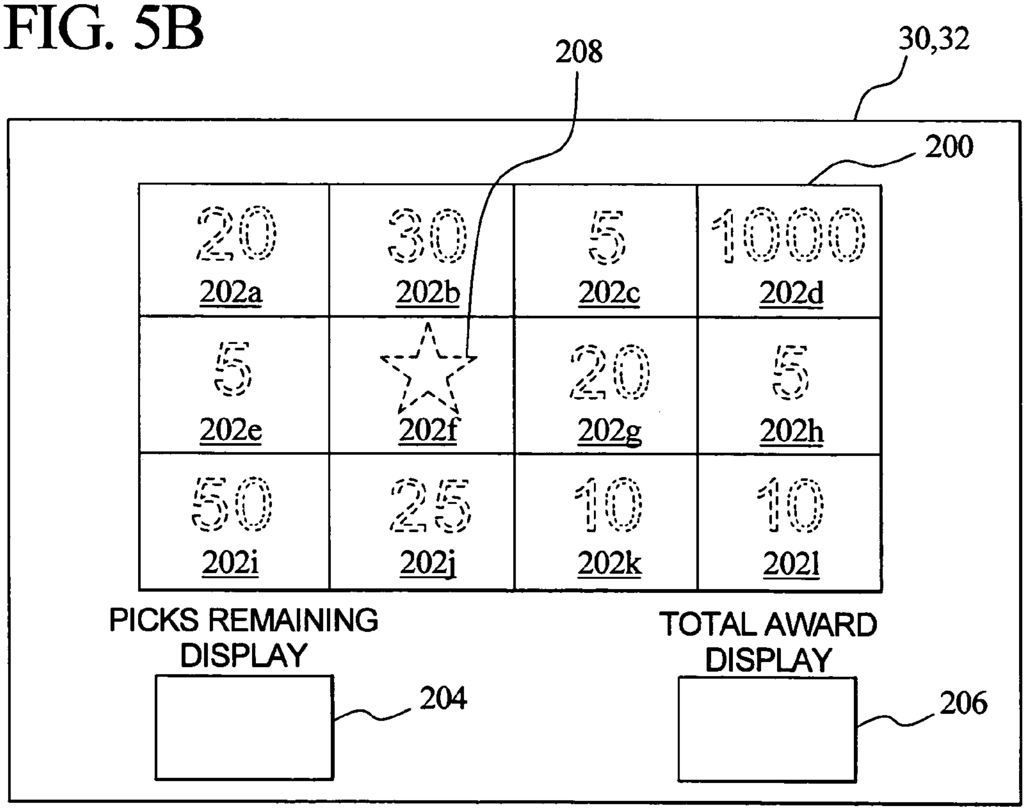

Referring now to FIGS. 5A and 5B, another embodiment of the present invention is illustrated where a bonus symbol 106 is associated with at least one of the selections 102 in the plurality of first selections 100. In one embodiment, the bonus symbol provides one or more additional picks to the player if the player picks the selection 102 associated with the bonus symbol 106. In another embodiment, the bonus symbol provides one or more multipliers to the player.

In FIG. 5A, the bonus symbol is designated by a star. It should be appreciated that the bonus symbol may be any symbol, character, or shape as desired by the game implementor. Also, the bonus symbol may provide the player with additional picks, a multiplier which multiplies the present number of picks displayed in the picks remaining display 104 or modifies the picks in some other suitable manner. The bonus symbol may also be associated with at least one of the selections 202 in the plurality of second selections 200 wherein the bonus symbol may provide additional picks, multipliers or other modifiers to the player.

In FIG. 5B, the bonus symbol 208 is associated with selection 202*f*. It should be appreciated that the bonus symbol 208 may be associated with one or more of the selections 202 in the plurality of second selections 200. In one embodiment, the bonus symbol 208 provides an additional pick to the player from the plurality of second selections 200 when the player picks the selection 202 associated with the bonus symbol 208. The bonus symbol, therefore, enables the player to obtain additional picks in the bonus game and potentially receive extra awards and larger awards in the bonus game. In a further embodiment, at least one additional pick is associated with one of the first or second selections.

Figure 6:
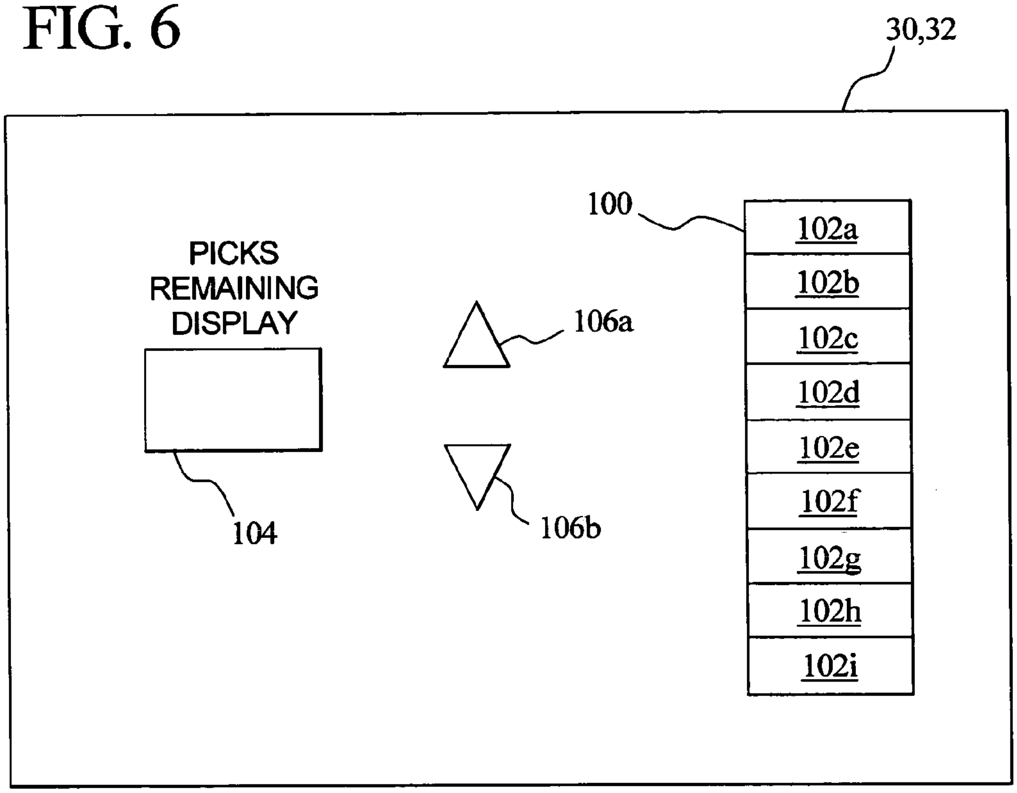
FIG. 6 is an enlarged front elevation view of one of the display devices of FIGS. 1A and 1B illustrating a further embodiment of the present invention where the bonus game includes relationship indicators associated with the plurality of first selections.

Referring now to FIG. 6, a further embodiment of the present invention is illustrated where the plurality of first selections are arranged in a column. Two relationship indicators, designated as an upward facing arrow 106*a* and a downward facing arrow 106*b*, indicate the relationship of the trigger selection with respect to the selection picked by the player. For example, if the trigger selection is selection 102*a* and the player picks selection 102*c*, the gaming device illuminates or highlights the relationship indicator 106*a* to indicate that the trigger selection is higher than or above the picked selection 102*c*. Likewise, if the trigger selection is lower or below the picked selection 102*c*, the relationship indicator or downward facing arrow 106*b* is illuminated or highlighted by the gaming device. The relationship indicators enable the player to identify the relative location of the trigger selection more quickly and therefore enables the player to potentially receive more picks to use for picking selections from the plurality of second selections 200 (not shown).

Figure 7:
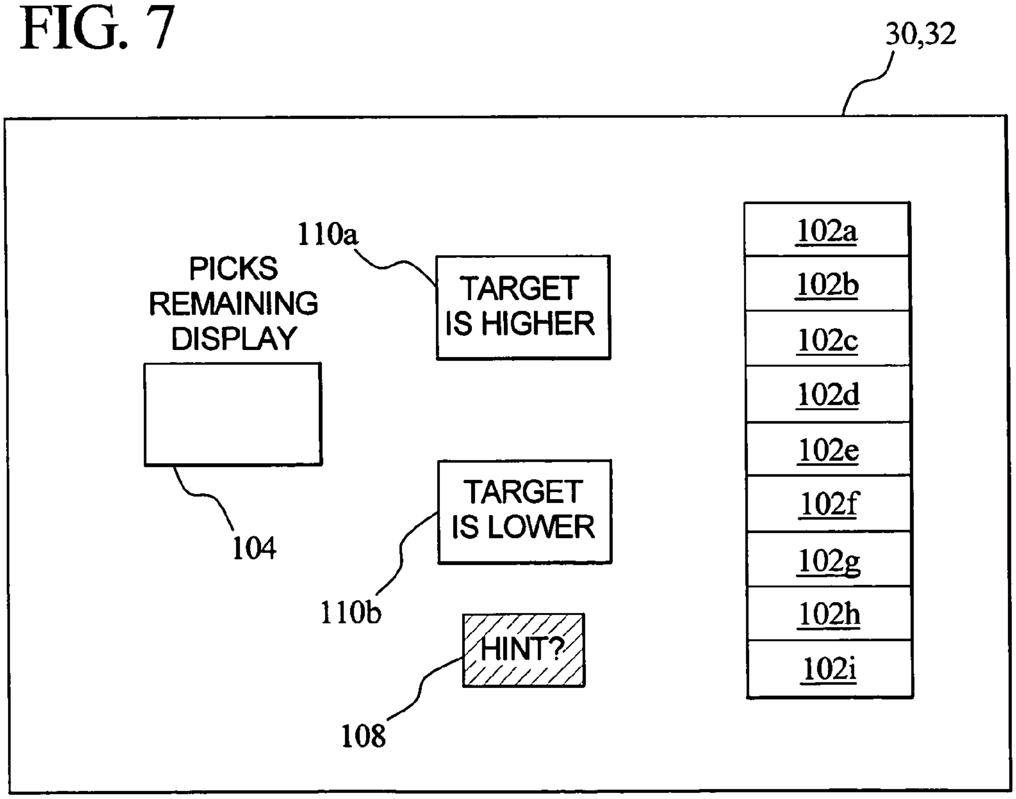
FIG. 7 is an enlarged front elevation view of one of the display devices of FIGS. 1A and 1B illustrating another embodiment of the present invention where the player has an option of using the relationship indicators associated with the plurality of first selections.

Referring to FIG. 7, another embodiment of the present invention is illustrated where the relationship indicators 110*a* and 110*b* indicate whether the target is higher or the target is lower than a picked selection, respectively. It should be appreciated that the relationship indicators 110*a* and 110*b* may include words, phrases, characters or other designations that indicate the relationship of the trigger selection to the picked selection by the player.

In this embodiment, a player selectable button or selector 108 is also displayed to the player. The button or selector 108 is designated with the question "HINT?" to enable the player to choose whether they want to receive an indication of the location of the trigger selection. If the player decides to receive a hint from the gaming device about the location of the trigger selection in the plurality of first selections 100, the player presses or selects the button or selector 108. Then, one of the relationship indicators 110*a* or 110*b* is illuminated or highlighted to indicate the relationship of the trigger selection to the last picked selection by the player.

In one embodiment, the gaming device deducts one or more picks from the player's total picks for providing the player with a hint or indication of the relative location of the trigger selection. In this manner, the player may use the relationship indicators to try to obtain the trigger selection more quickly. However, if the player does not obtain the trigger selection after receiving the hint, the player sacrifices additional picks. The player may opt not to receive any hints in the bonus game and proceed with selecting the selections 102 in the plurality of first selections 100 as described above. The hint button or selector 108 give the player the opportunity to receive more picks than the player might receive if the player picked the selections without any hints.

Figure 8A:
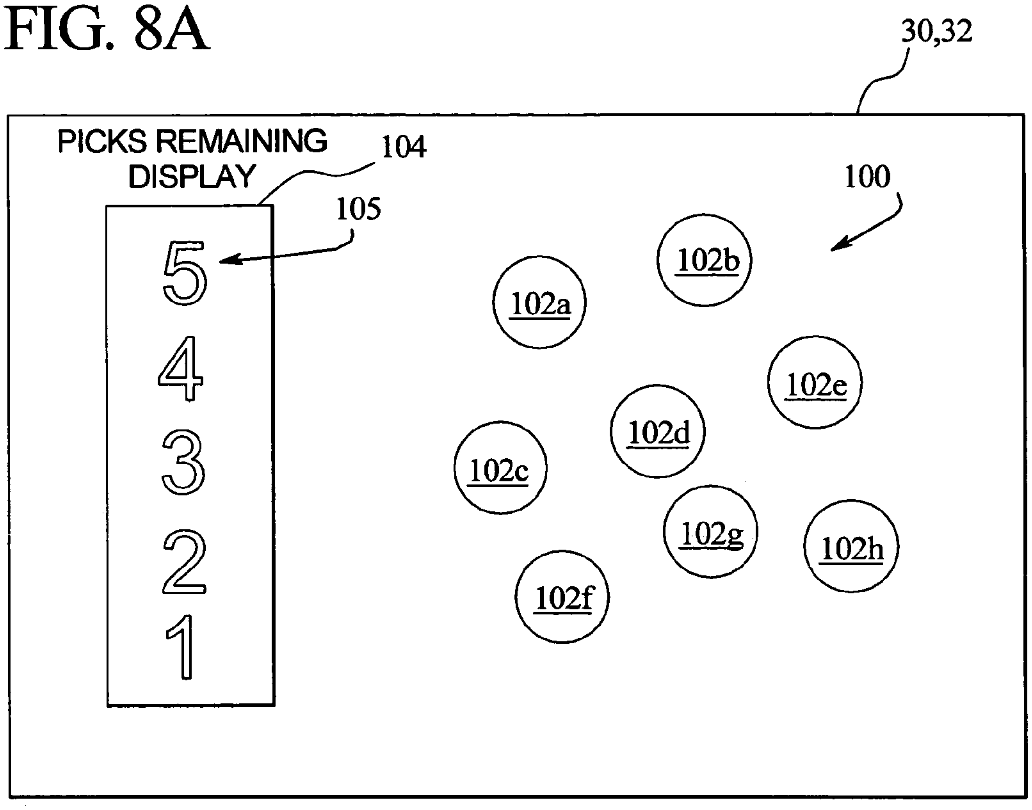
FIGS. 8A and 8B are enlarged front elevation views of one of the display devices of FIGS. 1A and 1B illustrating another embodiment of the present invention where the picks remaining display, plurality of first selections, and plurality of second selections are designated by different symbols.
Figure 8B:
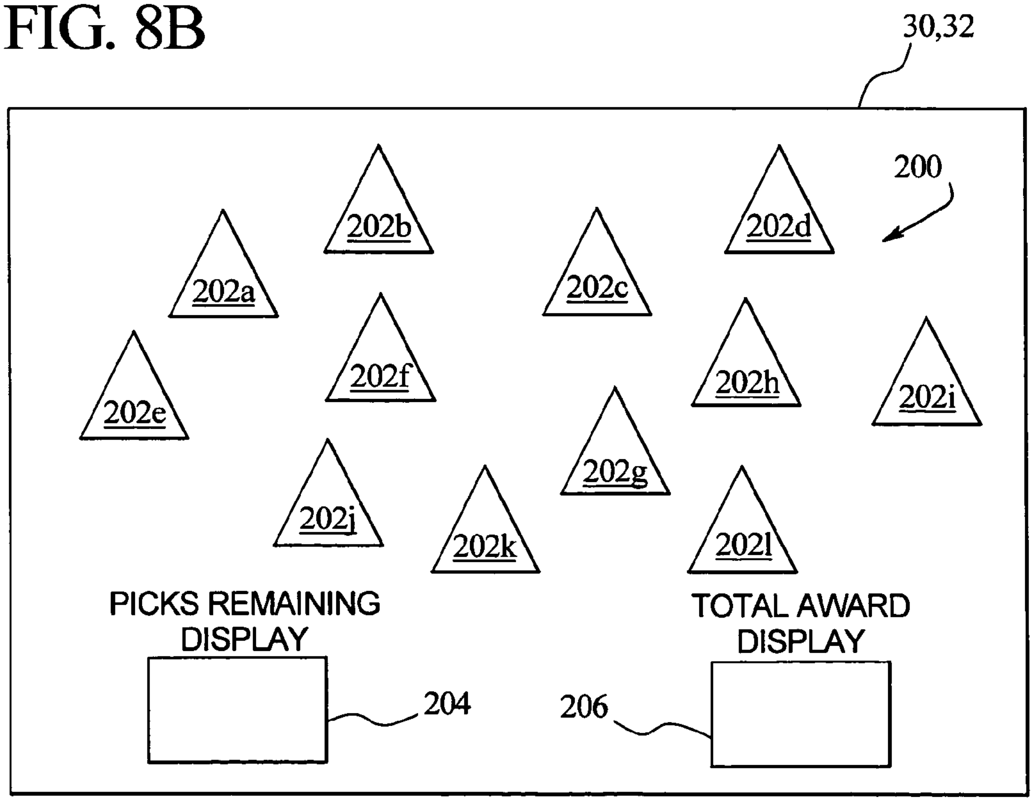

Referring now to FIGS. 8A and 8B, a further embodiment of the present invention is illustrated where the number of picks, the plurality of first selections 100 and the plurality of second selections 200 are displayed as different shapes or symbols. This embodiment shows that the number of picks 105 may be a number displayed in a display such as the picks remaining display 104 illustrated in FIGS. 3A to 7, a number as shown in FIG. 8A, or some other designation as desired by the game implementor. In FIG. 8A, the gaming device highlights or illuminates the remaining number of picks in the bonus game at any given time in the bonus game. Additionally, the plurality of first selections 100 and the plurality of second selections 200 may be any shape, character, symbol or other designation as desired.

Figure 9A:
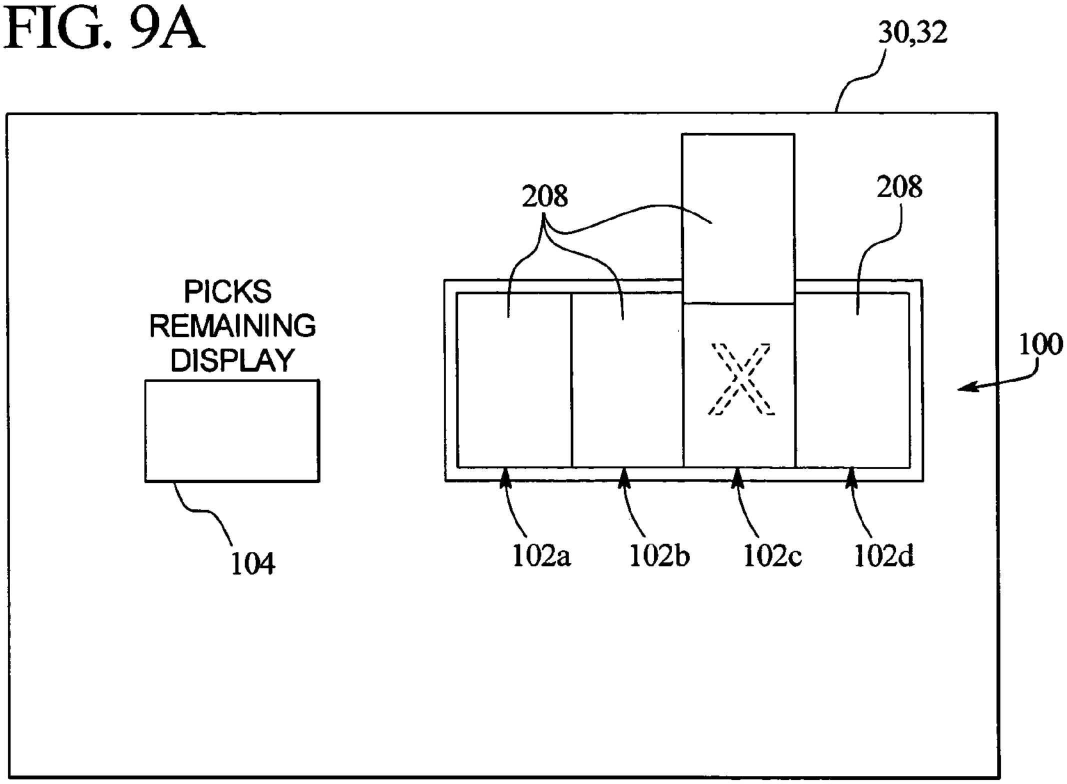
FIG. 9A is an enlarged front elevation view of one of the display devices of FIGS. 1A and 1B illustrating an alternative embodiment of the present invention wherein mechanical doors cover the first selections and move or slide up and down to hide and reveal the first selections.
Figure 9B:
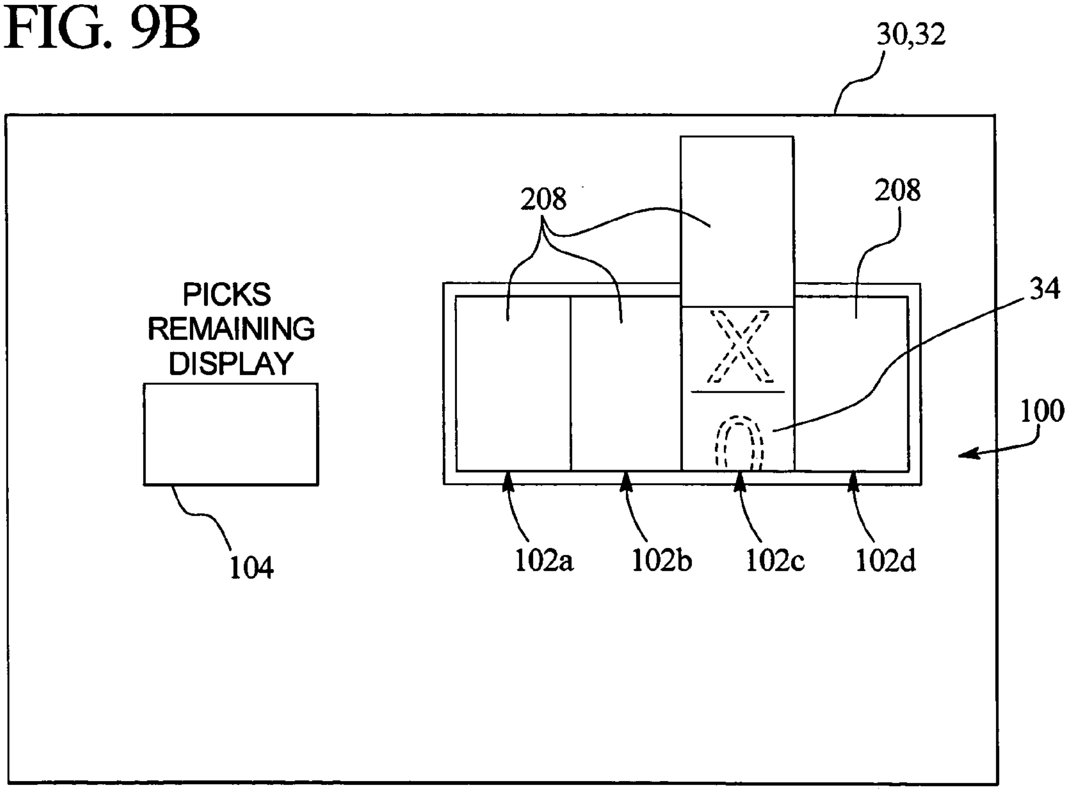
FIG. 9B is an enlarged front elevation view of one of the display devices of FIGS. 1A and 1B illustrating an alternative embodiment of the present invention wherein the mechanical doors of FIG. 9A cover mechanical reels that display the first selections.

In an alternative embodiment illustrated in FIGS. 9A and 9B, the first selections 100 are displayed on a mechanical display. In FIG. 9A, the trigger selection is displayed on a display device such as a video display device and mechanical doors 208 cover the display device. Each selection 102*a*, 102*b*, 102*c* and 102*d* is covered by a mechanical door 208, which moves or slides up and down to reveal or hide the selections, respectively. The doors 208 move or slide within channels (not shown) or similar devices that are connected to the gaming device. After the player picks a selection, such as selection 102*c*, the door 208 associated with that selection slides upward or opens to reveal that selection. Once the player picks the trigger selection or when the player runs out of picks, any doors 208 that are in the open or upward position, drop down to cover or hide the selections.

In FIG. 9B, the doors 208 cover mechanical reels 34, which include a plurality of symbols having the trigger selection. Initially, the doors 208 are closed or cover the reels 34. The gaming device spins or activates the reels 34. Once the reels stop spinning, one or more symbols are indicated on the reels where one of the symbols represents the trigger selection. The player picks the selections 102 until the player picks the trigger selection 102*c* or until the player runs out of picks. The doors 208 move upward, or open, to reveal the selections 102 after the player picks the selections, and close or lower when the game ends as described above. It should be appreciated that any suitable covering or revealing panel or member could be employed to reveal the selections.

Figure 10:
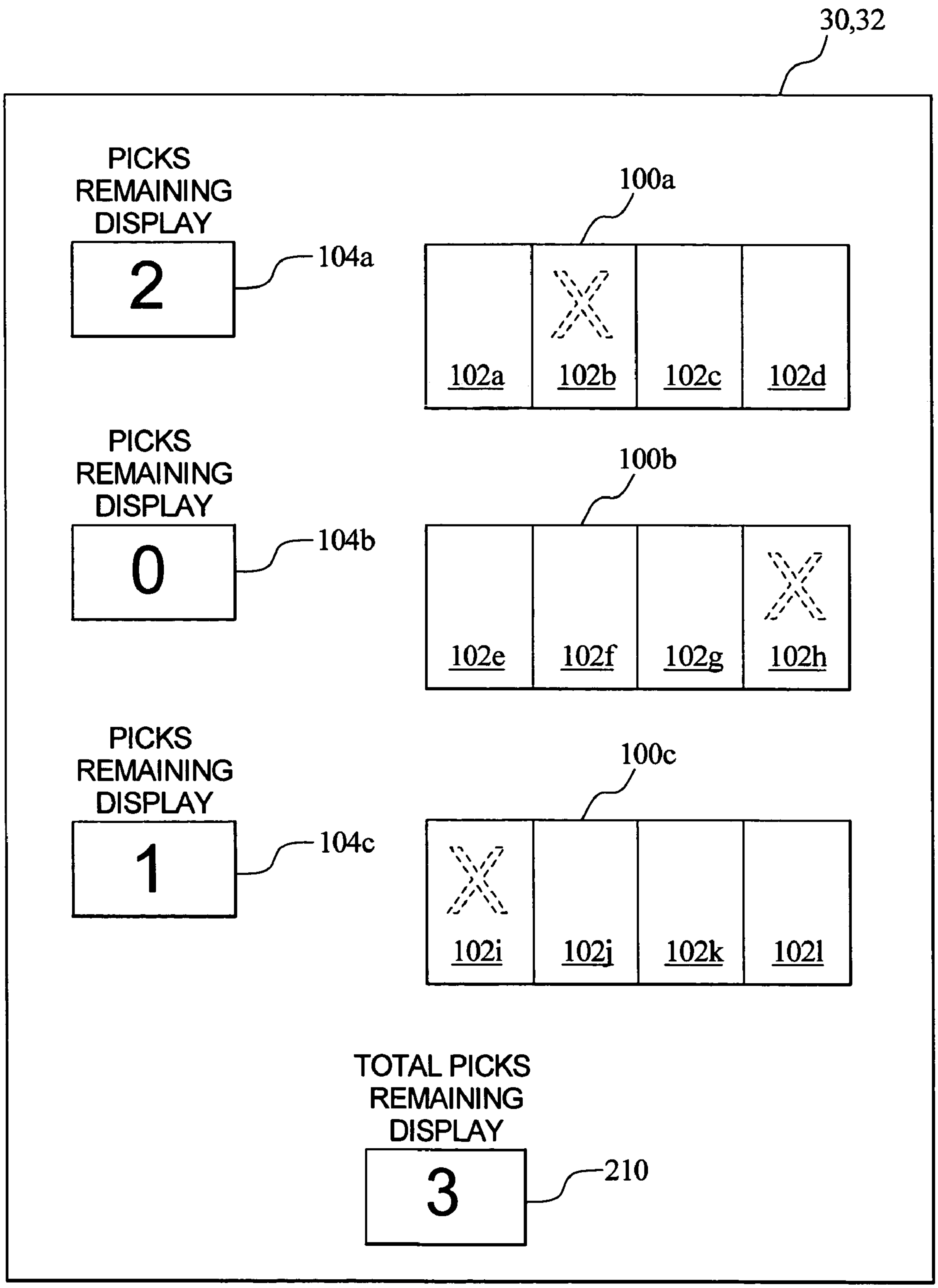
FIG. 10 is an enlarged front elevation view of one of the display devices of FIGS. 1A and 1B illustrating another embodiment of the present invention wherein multiple sets of first selections are displayed to a player.

In another alternative embodiment illustrated in FIG. 10, several sets of first selections 100*a*, 100*b* and 100*c* are displayed to the player in the bonus game. Additionally, the sets of first selections are associated with picks remaining displays 104*a*, 104*b* and 104*c*. In this illustration, the first set of first selections 100*a* includes selections 102*a*, 102*b*, 102*c* and 102*d*. The second set of first selections 100*b* includes selections 102*e*, 102*f*, 102*g* and 102*h*. The third set of first selections includes selections 102*i*, 102*j*, 102*k* and 102*l*. It should be appreciated that any number of selection sets 100 and associated picks remaining displays 104 may be displayed to the player. It should also be appreciated that any number of selections 102 may be included in the selection sets 100.

In this alternative embodiment, the selections 102 in each of the selection sets 100 are initially masked or hidden from the player. Each picks remaining display 104*a*, 104*b* and 104*c* indicates a number of picks to be used to choose selections in the associated selection sets 100*a*, 10*b* and 100*c*. It should be appreciated that the picks remaining displays 104 may indicate the same number of picks, a different number of picks or any combination therein. The player picks selections 102 in each of the selection sets 100 until the player picks the trigger selection 102*b*, 102*h* and 102*i* in each of the selection sets, or until the player runs out of picks for one or more of the selection sets. In one embodiment, the number of picks remaining for each of the selection sets 100*a*, 100*b* and 100*c* is indicated in the corresponding picks remaining displays 104*a*, 104*b* and 104*c*, after the player is finished picking selections in the selection sets, is summed or totaled and indicated in the total picks remaining display 210. It should be appreciated that the individual number of picks associated with each set of first selections may be added, multiplied or combined in any manner as desired to achieve the total number of picks remaining in the game.

The total number of picks indicated in total picks remaining display 210 is the number of picks provided to the player to choose second selections to obtain awards. For example in FIG. 10, the number of picks indicated in picks remaining display 104*a* is two, the number of picks indicated in picks remaining display 104*b* is zero and the number of picks indicated in picks remaining display 104*c* is one. Therefore, the total number of picks available to the player to pick second selections in the game is three as indicated by the total picks remaining display 210. It should be appreciated that other suitable methods may be used with the plurality of first selections sets to obtain picks in the second selection sets. For example in one embodiment, the player must pick the trigger selection in all of the first selection sets to obtain picks for the second selections. Similarly, in other embodiments, the player must pick at least two of the trigger selections, specific trigger selections or any combination therein to obtain picks for the second selections.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. A method of operating a gaming device, said method comprising:

(a) displaying a plurality of masked first selections, wherein at least one of said first selections is a trigger selection;

(b) displaying a number of picks, wherein the number of picks is greater than the number of first selections;

(c) enabling a player to pick the first selections until the player picks the trigger selection;

(d) reducing the number of picks for each first selection picked by the player;

(e) enabling the player to pick one or more of a plurality of displayed masked second selections with the picks remaining after the player picks the trigger selection and until no picks remain or no unpicked second selections remain, wherein a plurality of awards are associated with the second selections; and (f) providing the awards associated with the picked second selections to the player.

2. The method of claim 1, wherein reducing the number of picks for each picked first selection includes reducing the number of picks by a predetermined amount.

3. The method of claim 1, wherein the awards include a plurality of relatively small awards and at least one relatively large award.

4. The method of claim 1, wherein the awards are selected from the group consisting of: at least one free spin, at least one free game, a multiplier and at least one credit.

5. The method of claim 1, which includes providing at least one additional pick to the player if the player picks a designated one of the first or second selections.

6. The method of claim 1, which includes multiplying at least one of the awards associated with at least one of the picked second selections by a multiplier.

7. The method of claim 1, which includes for at least one picked first selection that is not the trigger selection, displaying at least one relationship indicator which identifies a relationship between the trigger selection and said first selection picked by the player.

8. The method of claim 1, wherein no awards are associated with the first selections and the picks of the first selections are for the purpose of determining how many remaining picks the player will have of the second selections.

9. The method of claim 1, which is provided through a data network.

10. The method of claim 9, wherein the data network is an internet.

11. A method of operating a gaming device, said method comprising:

(a) displaying a plurality of masked first selections, wherein at least one of said first selections is a trigger selection;

(b) displaying a number of picks, wherein the number of picks is greater than the number of first selections;

(c) enabling a player to pick the first selections until the player picks the trigger selection, and for each picked first selection that is not the trigger selection, displaying at least one relationship indicator which identifies a relationship between the trigger selection and said picked first selection;

(d) reducing the number of remaining picks for each pick by the player from the first selections;

(e) enabling the player to pick one or more of a plurality of displayed masked second selections with the picks remaining after the player picks the trigger selection and until no picks remain or no unpicked second selections remain, wherein a plurality of awards are associated with the second selections; and (f) providing to the player each award associated with each second selection picked by the player.

12. The method of claim 11, which includes providing at least one additional pick to the player if the player picks a designated one of the first or second selections.

13. The method of claim 11, which includes multiplying at least one of the awards associated with at least one of the picked second selections by a multiplier.

14. The method of claim 11, wherein the awards are selected from the group consisting of: at least one free spin, at least one free game, a multiplier and at least one credit.

15. The method of claim 11, wherein no awards are associated with the first selections and the picks of the first selections are for the purpose of determining how many remaining picks the player will have of the second selections.

16. The method of claim 11, which is provided through a data network.

17. The method of claim 16, wherein the data network is an internet.

18. A method of operating a gaming device, said method comprising:

(a) displaying a plurality of masked first selections, wherein at least one of said first selections is a trigger selection;

(b) displaying a number of picks, said number being at least two;

(c) enabling a player to pick a plurality of the first selections;

(d) reducing the number of picks for each first selection picked by the player;

(e) displaying a plurality of masked second selections if the player picks the trigger selection and at least one pick remains, wherein a plurality of awards are associated with the second selections, and enabling the player to pick one or more of the second selections with the picks remaining and until no picks remain or no unpicked second selections remain; and (f) providing to the player each award associated with each picked second selection.

19. The method of claim 18, wherein the awards are selected from the group consisting of: at least one free spin, at least one free game, a multiplier and at least one credit.

20. The method of claim 18, which includes providing at least one additional pick to the player if the player picks a designated one of the first or second selections.

21. The method of claim 18, which includes multiplying at least one of the awards associated with at least one of the picked second selections by a multiplier.

22. The method of claim 18, which includes, for at least one picked first selection that is not the trigger selection, displaying at least one relationship indicator which identifies a relationship between the trigger selection and said first selection.

23. The method of claim 18, wherein no awards are associated with the first selections and the picks of the first selections are for the purpose of determining how many remaining picks the player will have of the second selections.

24. The method of claim 18, wherein the number of picks is greater than the number of first selections.

25. The method of claim 18, which is provided through a data network.

26. The method of claim 25, wherein the data network is an internet.

27. A method of operating a gaming device, said method comprising:

(a) displaying a plurality of sets, each set including a plurality of masked first selections, wherein said first selections in each of said sets includes at least one trigger selection;

(b) displaying a separate number of picks associated with each of the sets;

(c) enabling a player to pick the first selections in each of the sets until the player picks the trigger selection in each of a plurality of the sets;

(d) unmasking each of the picked first selections in the sets;

(e) for each set, reducing the number of remaining picks for each picked first selection in said set;

(f) displaying a plurality of masked second selections to the player if the player picks a plurality of the trigger selections in the sets, wherein a plurality of awards are associated with the second selections;

(g) displaying a total number of picks of the second selections based on a sum of the picks remaining for each set;

(h) enabling the player to pick one of the second selections;

(i) unmasking the picked second selection;

(j) reducing the total number of picks for each picked second selection;

(k) providing to the player any of the awards associated with the picked second selection; and (I) repeating steps (h) to (k) until no picks remain or no second selections remain.

28. The method of claim 27, wherein the number of picks associated with at least one of the sets is greater than the number of first selections in said set.

29. The method of claim 27, wherein the respective number of picks associated with each one of the sets is greater than the number of first selections in said set.

30. The method of claim 27, wherein the number of picks associated with at least two of the sets are different.

31. The method of claim 27, wherein the number of picks associated with each of the sets are different.

32. The method of claim 27, wherein the number of first selections in at least two of the sets are different.

33. The method of claim 27, wherein the number of first selections in each of the sets are different.

34. The method of claim 27, wherein the number of picks associated with at least two of the sets are different and the number of first selections in at least two of the sets are different.

35. The method of claim 27, wherein reducing the number of remaining picks for each set includes reducing the number of picks by a predetermined amount.

36. The method of claim 27, wherein the awards are selected from the group consisting of: at least one free spin, at least one free game, a multiplier and at least one credit.

37. The method of claim 27, which includes, for at least one picked first selection of one of said first sets that is not the trigger selection in said set, displaying at least one relationship indicator which identifies a relationship between the trigger selection of said set and the selection picked by the player.

38. The method of claim 27, wherein no awards are associated with the first selections and the picks of the first selections are for the purpose of determining how many remaining picks the player will have of the second selections.

39. The method of claim 27, wherein for at least two of the set the number of picks is greater than the number of first selections is said sets.

40. The method of claim 27, which is provided through a data network.

41. The method of claim 40, wherein the data network is an internet.

42. A method of operating a gaming device, said method comprising:

(a) displaying a plurality of masked first selections, wherein at least one of said first selections is a trigger selection;

(b) displaying a number of first picks, said number being at least two;

(c) enabling the player to pick the first selections until the player picks the trigger selection;

(d) reducing the number of first picks for each first selection picked by the player;

(e) determining a number of second picks of a plurality of second selections based on the number of first picks used to select the trigger selection;

(f) enabling the player to pick one or more of a plurality of displayed masked second selections with the number of second picks after the player picks the trigger selection and until no second picks remain or no unpicked second selections remain, wherein a plurality of awards are associated with the second selections; and (g) providing to the player each award associated with each picked second selection.

43. The method of claim 42, which includes providing a consolation award to the player if the player picks the trigger selection with a final one of the first picks.

44. The method of claim 42, which includes providing a consolation award to the player if the player does not pick the trigger selection before running out of first picks.

45. The method of claim 42, wherein the awards are selected from the group consisting of: at least one free spin, at least one free game, a multiplier and at least one credit.

46. The method of claim 42, which includes, for at least one picked first selection that is not the trigger selection, displaying at least one relationship indicator which identifies a relationship between the trigger selection and said first selection picked by the player.

47. The method of claim 42, wherein no awards are associated with the first selections.

48. The method of claim 42, which is provided through a data network.

49. The method of claim 48, wherein the data network is an internet.

50. A gaming device operated under control of a processor, said gaming device comprising:

a plurality of first selections including at least one trigger selection;

a plurality of second selections;

a plurality of awards associated with the second selections;

a number of picks associated with said first and second selections;

at least one relationship indicator;

at least one input device in communication with the processor, said input device including a selector; and at least one display device controlled by the processor and operable to display the first selections, the second selections, the awards, the number of picks, and the relationship indicator, wherein the processor, input device and display device are operable to:

(a) enable a player to pick the first selections until the player picks the trigger selection, and after at least one of the picks of the first selections which is not the trigger selection, enable the player to pick the selector which causes the relationship indicator to identify a relationship between the trigger selection and said picked selection, (b) reduce the number of picks for each picked first selection and each pick of the selector, (c) after the player picks the trigger selection and there are picks remaining, enable the player to pick one or more of the second selections with the picks remaining and until no picks remain or no unpicked second selections remain, and (d) provide to the player each award associated with each picked second selection.

51. The gaming device of claim 50, wherein the number of picks is reduced by a predetermined amount.

52. The gaming device of claim 50, wherein the awards are selected from the group consisting of: at least one free spin, at least one free game, a multiplier and at least one credit.

53. The gaming device of claim 50, wherein no awards are associated with the first selections and the picks of the first selections are for the purpose of determining how many remaining picks the player will have of the second selections.

54. The gaming device of claim 50, wherein the number of picks is greater than the number of first selections.

55. A method of operating a gaming device, said method comprising:

(a) displaying a plurality of first selections including at least one trigger selection;

(b) displaying a number of picks, said number being at least two;

(c) enabling a player to pick the first selections until the player picks the trigger selection, and after at least one of the picks of the first selections which is not the trigger selection, enabling the player to pick a selector which causes a relationship indicator to identify a relationship between the trigger selection and said picked selection;

(d) reducing the number of picks for each picked first selection and each pick of the selector;

(e) after the player picks the trigger selection and there are picks remaining, displaying a plurality of second selections and enabling the player to pick one or more of the second selections with the picks remaining and until no picks remain or no unpicked second selections remain, wherein a plurality of awards are associated with the second selections; and (f) providing to the player each award associated with each picked second selection.

56. The method of claim 55, which includes reducing the number of picks by a predetermined amount.

57. The method of claim 55, wherein the awards are selected from the group consisting of: at least one free spin, at least one free game, a multiplier and at least one credit.

58. The method of claim 55, wherein no awards are associated with the first selections and the picks of the first selections are for the purpose of determining how many remaining picks the player will have of the second selections.

59. The method of claim 55, which is provided through a data network.

60. The method of claim 59, wherein the data network is an internet.

* * * * *